(12) United States Patent
Wang et al.

(10) Patent No.: US 9,215,589 B2
(45) Date of Patent: Dec. 15, 2015

(54) METHODS AND DEVICES FOR ESTABLISHING SECURITY ASSOCIATIONS AND PERFORMING HANDOFF AUTHENTICATION IN COMMUNICATIONS SYSTEMS

(75) Inventors: Jui-Tang Wang, Hsinchu (TW); Tzu-Ming Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 130 days.

(21) Appl. No.: 13/440,710

(22) Filed: Apr. 5, 2012

(65) Prior Publication Data
US 2012/0189124 A1   Jul. 26, 2012

Related U.S. Application Data

(62) Division of application No. 12/203,671, filed on Sep. 3, 2008.

(60) Provisional application No. 60/969,773, filed on Sep. 4, 2007, provisional application No. 60/981,767, filed on Oct. 22, 2007, provisional application No. 60/985,538, filed on Nov. 5, 2007.

(51) Int. Cl.
*H04W 12/06* (2009.01)
*H04L 29/06* (2006.01)
(Continued)

(52) U.S. Cl.
CPC .............. *H04W 12/06* (2013.01); *H04L 63/062* (2013.01); *H04W 12/04* (2013.01); *H04W 36/0038* (2013.01); *H04W 88/08* (2013.01)

(58) Field of Classification Search
CPC ............................. H04W 12/04; H04W 12/06
USPC .......................... 380/270; 455/411; 726/3, 4, 7
See application file for complete search history.

(56) References Cited

U.S. PATENT DOCUMENTS

2006/0031316 A1    2/2006  Forstadius
2007/0160017 A1    7/2007  Meier et al.
(Continued)

FOREIGN PATENT DOCUMENTS

JP    2004-266331    9/2004
JP    2007-221808    8/2007
(Continued)

OTHER PUBLICATIONS

IEEE 802.16e(TM) Standard Part 16: Air Interface for Fixed and Mobile Broadband Wireless Access Systems, Feb. 28, 2006, p. 1,50-52,61, 201-208, 244, 270-277, 280, 292, 309-312, 567, 711-712.*
(Continued)

*Primary Examiner* — Alexander Lagor
(74) *Attorney, Agent, or Firm* — Finnegan, Henderson, Farabow, Garrett & Dunner LLP

(57) ABSTRACT

A method of providing secure communications between a base station, a relay station, and a mobile station in a communication network includes receiving, by the relay station, an unsolicited security key from the base station; receiving, by the relay station, a signaling message from the mobile station; and authenticating, by the relay station, the mobile station using the security key. A method of providing secure communications between a base station, a relay station, and a mobile station in a communication network includes receiving, by the relay station, a signaling message from the mobile station; transmitting, by the relay station, subsequent to receiving the signaling message, a security key request to the base station; receiving, by the relay station, a security key from the base station in response to the previously sent security key request; and authenticating, by the relay station, the mobile station using the received security key.

45 Claims, 17 Drawing Sheets

(51) Int. Cl.
  *H04W 12/04* (2009.01)
  *H04W 36/00* (2009.01)
  *H04W 88/08* (2009.01)

(56) References Cited

U.S. PATENT DOCUMENTS

2008/0108303 A1* 5/2008 Okuda ............................ 455/7
2010/0115598 A1* 5/2010 Barriga et al. .................. 726/8

FOREIGN PATENT DOCUMENTS

WO   WO 2005074315 A1 *  8/2005
WO   WO 2007/046630 A2    4/2007

OTHER PUBLICATIONS

Extended European Search Report for Application No. 08252944.7, from the European Patent Office, dated Feb. 4, 2011.
IEEE 802.16 Broadband Wireless Access Working Group, "Message Authentication in Distributed Security Architecture," Jul. 14, 2007.
IEEE 802.16 Broadband Wireless Access Working Group, "Security Key Management in The Event of HO" (Mar. 15, 2008).
IEEE 802.16 Broadband Wireless Access Working Group, "TEK Transfer in Relay Systems," (Mar. 5, 2007).
IEEE 802.16 Broadband Wireless Access Working Group, "An Asymmetric Security Mechanism Used in Security Zone," (Jul. 5, 2007).
IEEE 802.16 Broadband Wireless Access Working Group, "Authentication of Management Messages in a Relay System," (Jul. 16, 2007).
IEEE 802.16 Broadband Wireless Access Working Group, "MS Context Transfer for Optimized HO Process," (Mar. 19, 2008).
IEEE 802.16j/D3 Part 16: Air Interface for Fixed and Mobile Broadband Wireless Access Systems, "Multihop Relay Specification," (Feb. 29, 2008).
IEEE Standard for Local and Metropolitan Area Networks Part 16: Air Interface for Fixed and Mobile Broadband Wireless Access Systems Amendment 2: Physical and Medium Access Control Layers for Combined Fixed and Mobile Operation in Licensed Bands and Corrigendum 1, dated Feb. 28, 2006.
Japanese Notice of Grant dated Nov. 15, 2011.
Lee et al., MS MAC Handover Procedure in an MR Network—Handover Execution, IEEE C802.12j-07/084r1, dated Jan. 16, 2007.

* cited by examiner

METHODS AND DEVICES FOR ESTABLISHING SECURITY ASSOCIATIONS AND PERFORMING HANDOFF AUTHENTICATION IN COMMUNICATIONS SYSTEMS

PRIORITY

This application is a divisional of application Ser. No. 12/203,671, filed Sep. 3, 2008 which claims the benefit of priority of U.S. Provisional Application No. 60/969,773, filed Sep. 4, 2007; U.S. Provisional Application No. 60/981,767, filed Oct. 22, 2007; and U.S. Provisional Application No. 60/985,538, filed Nov. 5, 2007, all of which are incorporated by reference herein in their entirety for any purpose.

TECHNICAL FIELD

The present disclosure relates to the field of communications and, more particularly, to systems and methods for establishing security associations and performing handoff authentication in a communication system.

BACKGROUND

Conventional wireless network environments connect mobile electronic devices to a service provider. More specifically, WiMAX (Worldwide Interoperability for Microwave Access) network environments connect a client device, through intermediate connections, to, for example, the Internet. WiMAX is a wireless networking technology that provides communication to wireless devices over significant distances. Authentication and reauthentication delays, however, can slow communication with the client device and decrease the efficiency of a WiMAX environment.

FIG. 1 is a block diagram of an exemplary prior art wireless communication system for use in an IEEE 802.16d/802.16e WiMAX wireless communication system. Access to Internet 100 is provided to at least one connectivity service network (CSN) 102, using at least one authentication, authorization, and accounting (AAA) server 104. CSN 102 is connected to gateways (GWs) 106 and 108. Gateways 106 and 108 are typically connected to several base stations (BSs) 110-115, the number of such BSs depending on network demands in a given area, though a gateway may instead be connected to only a single base station. Only two gateways 106 and 108 are shown, but it is possible to have greater or fewer gateways depending on the number of required base stations.

In FIG. 1, six base stations are shown as an exemplary WiMAX environment, but greater or fewer base stations may be provided depending on the number of available gateways and the network demands in the WiMAX environment. Base stations, such as base station 110 and base station 114, communicate with one or more client devices. Client devices include mobile stations (MSs), such as mobile stations 120, 122 and 124, to which the base stations provide wireless network service, and subscriber stations (SSs), such as subscriber stations 126 and 128, to which base stations provide wired or wireless network service. The network needs of several client devices may be satisfied by a single base station, and a single base station may satisfy the network needs of both mobile stations and subscriber stations.

In the conventional WiMAX environment, such as that shown in FIG. 1, each time mobile station 120 is initially served by a gateway, e.g., gateway 106, via an associated base station, e.g., base station 110, it is necessary to authenticate mobile station 120. Following such authentication, so long as mobile station 120 moves in areas that enable continued service via the original authenticating gateway, no further gateway authentication is required. However, if mobile station 120 moves to an area served by a different gateway, e.g., gateway 108, mobile station 120 is handed over to the different gateway, so that it is necessary for that different gateway to reauthenticate mobile station 120 as part of the handoff processing before service may be provided. After a client device has been authenticated or reauthenticated, security associations, or the sharing of security information between two network entities such as mobile station 120 and base station 110, are established to ensure that communications between the two entities are secure.

Authentication protocol standards have been created to standardize advance authentication techniques. These standardized protocols may include, for example, IEEE 802.1X authentication, extensible authentication protocol (EAP) method for global system for mobile communications (GSM) subscriber identity (EAP-SIM) and extensible authentication protocol method for universal mobile telecommunications systems (UMTS) authentication and key agreement (EAP-AKA) and/or a combination of the extensible authentication protocol (EAP) and the remote authentication dial in user service (RADIUS) protocol. In addition, standardized handshake protocols, such as security association signaling protocols, e.g., security association and traffic encryption key (SA-TEK) 3-way handshakes, and traffic encryption key (TEK) 3-way handshakes may be used to establish security associations over a communication link.

In IEEE 802.16d/802.16e WiMAX wireless communication systems, these standardized techniques are performed between a base station and a mobile station. Each standardized authentication technique requires multiple transmissions, which consume authentication time and processing overhead.

FIG. 2 is a signaling diagram of exemplary prior art authentication and authorization in an IEEE 802.16d and 802.16e WiMAX wireless communication system. An initialization process 200 is used to ensure that a mobile station requesting network service is authorized to access the network and to provide a security association between mobile stations and base stations to allow secure message transmission. For example, initialization process 200 may be used to provide a security association between mobile station 120 just after it moved into the range of base station 111 after previously being within the range of base station 110.

In the first step of initialization process 200, mobile station 120 is wirelessly connected to base station 111 through the link up process which includes, for example, a signaling message such as ranging request 202 and a signaling message such as a ranging response 204. Mobile station 120 must then go through a multi-step process of authentication such as IEEE 802.1X full authentication 206 with AAA server 104 through gateway 106. Then AAA server 104 computes a master session key (MSK) (not shown) for mobile station 120 and transfers the MSK to gateway 106, which stores the MSK in its cache. The product of authentication through, for example, the EAP method or other authentication method is the transfer of the MSK, which is known to AAA server 104, gateway 106, and mobile station 120. Gateway 106 will generate a pairwise master key (PMK) 210 and an authentication key (AK) 212 for mobile station 120, and transfer AK 212 to base station 111.

Mobile station 120 may also independently hold and store the MSK in its memory and may generate AK 212. Then base station 111 may perform SA-TEK 3-way handshake procedure 214 to confirm that the AK held by mobile station 120 is the same AK 212 held by base station 111. Using AK 212, commonly held by base station 111 and mobile station 120, base station 111 and mobile station 120 may both calculate respectively a verification key, such as a common message authentication code key (MACK) 215 that identifies mobile station 120 and a common key encryption key (KEK) 218. MACK 215 may identify an authenticated message generated by mobile station 120 and base station 111. KEK 218 may protect traffic key delivery from base station 120 to mobile station 111. Base station 110 and mobile station 120 may perform SA-TEK 3 way handshake procedure 214 with MACK 215 to authenticate each other. When SA-TEK 3-way handshake procedure 214 has been successfully completed, base station 110 may generate a traffic key, such as traffic encryption key (TEK) 220 and then carry out a TEK 3-way handshake procedure 216 with KEK 218 to establish a security association with mobile station 120. TEK 220 is typically randomly generated by the base station 111 and is used to encrypt data transmitted between mobile station 120 and base station 111 after mobile station 120 has been authenticated and authorized to access the network. SA-TEK 3-way handshake 214 and TEK 3-way handshake 216 are well-known in the art and will not be discussed further.

In initialization process 200 for use in IEEE 802.16d and 802.16e WiMAX wireless communication systems as shown in FIG. 2, base station 111 controls whether data transmission occurs over the channel between base station 111 and mobile station 120 because base station 111 and mobile station 120 both hold the same TEK 220, KEK 218, MACK 215, and AK 212. After a mobile station has established a security association with a base station, or, in other words, after a mobile station has been granted permission to communicate over the network, encrypted data transmission occurs between the mobile station and the base station using the TEK.

Referring again to FIG. 1, in operation, the strength of the signal and transmission quality may decrease as the network signal travels from gateway 106 or gateway 108 to base stations 110-115 to client devices 120, 122, 124, 126, and 128. Additionally, the signal and transmission quality decrease as a mobile station travels further from its serving base station. Signal quality and coverage may also be affected by factors such as physical structures, signal interferences, weather and transmission conditions and formats. Therefore, coverage gaps or holes may exist and users in those areas may have limited or no network access.

One solution to avoid or reduce coverage gaps is to provide more base stations, but this solution can be costly. Alternatively, a network may avoid or reduce coverage gaps and/or extend its network coverage by using relay stations (RSs), such as those implementing the concept of multi-hop relaying (MR) as set forth in IEEE 802.16j. Typically, base stations communicate with these relay stations, which boost and relay signals to and from mobile stations and base stations, but otherwise are not involved in authentication and/or establishing security associations.

FIG. 3 is a block diagram of an exemplary prior art wireless communication system for use in an IEEE 802.16j WiMAX wireless communication system with MR architecture. Similar to the IEEE 802.16d and 802.16e WiMAX wireless communication systems, access to Internet 100 is provided through at least one AAA server, such as AAA server 104, and via at least one gateway, such as gateway 106. For convenience, Internet 100, CSN 102, AAA server 104 and gateway 106 are referred to as core network 300. Network 300, and specifically, gateway 106, typically communicates with base stations 310-313 over a wired connection.

Four base stations 310-313 are shown in FIG. 3, but greater or fewer base stations may be provided. Base stations, such as base station 310, may communicate directly with one or more mobile stations, such as mobile station 320, via wireless transmission. Base stations, such as base station 311 and base station 312, may communicate indirectly with one or more mobile stations, such as mobile stations 322, 324, and 326. Base stations typically communicate with one or more relay stations, such as relay stations 328, 330, and 332, via wireless transmission, but they may also communicate over wired connections. Relay stations 328, 330, and 332 boost and relay the signal to/from mobile station 322 via wireless transmission. As shown, relay stations 328, 330, and 332 are fixed relay stations. However, base stations may also communicate with mobile relay stations (MRSs), such as mobile relay station 334. A mobile relay station could reside, for example, on a train, plane or automobile and provide its passengers having mobile stations with mobile network access to various base stations and/or relay stations as the mobile relay station travels. As shown in FIG. 3, mobile relay station 334 provides wireless service to mobile stations 324 and 326, but the network needs of only one mobile station, or several mobile stations, may be satisfied by a single mobile relay station. Although not shown, base stations, such as base stations 310-313, may also communicate with one or more subscriber station. The network needs of several client devices may be satisfied by a single base station either directly or through one or more relay stations. Moreover, relay stations 328, 330, and 332 may provide wireless service to additional relay stations, additional mobile relay stations, and/or additional mobile stations.

In some applications, the use of relay stations may increase the need for station-to-station (base/relay) handoffs and may require increased processing overhead for such handoffs due to the limited coverage areas of each relay station (including mobile relay stations). In addition, when secure communications are involved, the handoff process from one base/relay station to another base/relay station may require additional overhead and reduce efficiency, bandwidth, or quality of the communication connection.

The disclosed embodiments are directed to overcoming one or more of the problems set forth above.

SUMMARY OF THE INVENTION

In one aspect, the present disclosure is directed to a method of providing secure communications between a base station, a relay station, and a mobile station in a communication network. The method receives, by the relay station, an unsolicited security key from the base station, and receives, by the relay station, a signaling message from the mobile station. The method also authenticates, by the relay station, the mobile station using the security key.

In another aspect, the present disclosure is directed to a method of providing secure communications between a base station, a relay station, and a mobile station in a communication network. The method receives, by the relay station, a signaling message from the mobile station, and transmits, by the relay station, subsequent to receiving the signaling message, a security key request to the base station. The method also receives, by the relay station, a security key from the base station in response to the previously sent security key request, and authenticates, by the relay station, the mobile station using the received security key.

In another aspect, the present disclosure is directed to a method of providing secure communications between a target base station, a mobile relay station, and at least one mobile station in a communication network. The method transmits, by the mobile relay station, a signaling message to the target base station, the signaling message including a message authentication code (MAC) corresponding to the at least one mobile station. The method also receives, by the mobile relay station, a responsive signaling message from the target base station and receives, by the mobile relay station, at least one security key corresponding to the at least one mobile station from the target base station. In addition, the method authenticates, by the mobile relay station, the at least one mobile station using the corresponding security key.

In yet another aspect, the present disclosure is directed to a relay station for providing secure communications in a communication network. The relay station includes at least one memory to store data and instructions and at least one processor configured to access the memory. The at least one processor is configured to, when executing the instructions, authenticate, in response to a signaling message received from a mobile station, the mobile station using an unsolicited security key received from a base station.

In another aspect, the present disclosure is directed to a relay station for providing secure communications in a communication network. The relay station includes at least one memory to store data and instructions, and at least one processor configured to access the memory. The at least one processor is configured to and configured to, when executing the instructions, subsequent to receiving a signaling message from a mobile station, transmit a security key request to a base station, and authenticate the mobile station using a security key received from the base station in response to the previously transmitted security key request.

In yet another aspect, the present disclosure is directed to a base station for providing secure communications in a communication network. The base station includes at least one memory to store data and instructions and at least one processor configured to access the memory. The at least one processor is configured to, when executing the instructions, cause transmission of, in response to an indication that a mobile station entered into a coverage area of a base station, an unsolicited authentication key (AK) received from an authentication, authorization, and accounting server to a relay station.

In another aspect, the present disclosure is directed to a base station for providing secure communications in a communication network. The base station includes at least one memory to store data and instructions, and at least one processor configured to access the memory. The at least one processor is configured to, when executing the instructions, cause transmission of a security key to a relay station in response to a security key request received from a relay station.

In yet another aspect, the present disclosure is directed to a system for providing secure communications. The system includes a base station configured to provide access to a communication network, authenticate a mobile station over the network, receive at least one security key, and pre-distribute the at least one security key. The system also includes a relay station in communication with the base station for receiving the pre-distributed at least one security key unsolicited, and for providing secure data transmissions to the authenticated mobile station using the security key. The security key includes at least one of an authentication key (AK) and a verification key.

In another aspect, the present disclosure is directed to a system for providing secure communications. The system includes a base station configured to provide access to a communication network, authenticate a mobile station over the network, receive at least one security key, receive at least one security key request, and transmit the at least one security key in response to the security key request. The system also includes a relay station in communication with the base station for transmitting the at least one security key request to the base station, for receiving the at least one security key from the base station in response to the security key request, and for providing secure data transmissions to a mobile station using the security key. The security key includes at least one of an authentication key (AK) and a verification key.

In another aspect, the present disclosure is directed to a method of providing secure communications between a base station, a relay station, and a mobile station in a communication network. The method performs key distribution upon receipt of a key request from the relay station to distribute a verification key corresponding to the mobile station to the relay station, and performs key verification, by the relay station, to identify the mobile station.

In another aspect, the present disclosure is directed to a method of providing secure communications between a base station, a relay station, and a mobile station in a communication network. The method performs key pre-distribution to distribute an unsolicited verification key corresponding to the mobile station to the relay station, and performs key verification, by the relay station, to identify the mobile station.

In yet another aspect, the present disclosure is directed to a method of providing secure communications between a base station, a relay station, and a mobile station in a communication network. The method performs key verification, by the relay station, to identify the mobile station, and performs key verification, by the mobile station, to identify the relay station.

DETAILED DESCRIPTION

Embodiments of the disclosure can provide such security associations in IEEE 802.16j WiMAX wireless communication systems or other wireless communication networking systems that employ relay stations. By providing a relay station (RS) with the ability to establish a secure connection with mobile stations and provide mobile stations with access to the network, processing overhead can be significantly reduced. Specifically, by providing a relay station with the security material corresponding to a mobile station seeking access to the network, the relay station can establish a security association quickly with the mobile station and perform mobile station authentication and authorization when mobile station handoff occurs.

Figure 1:
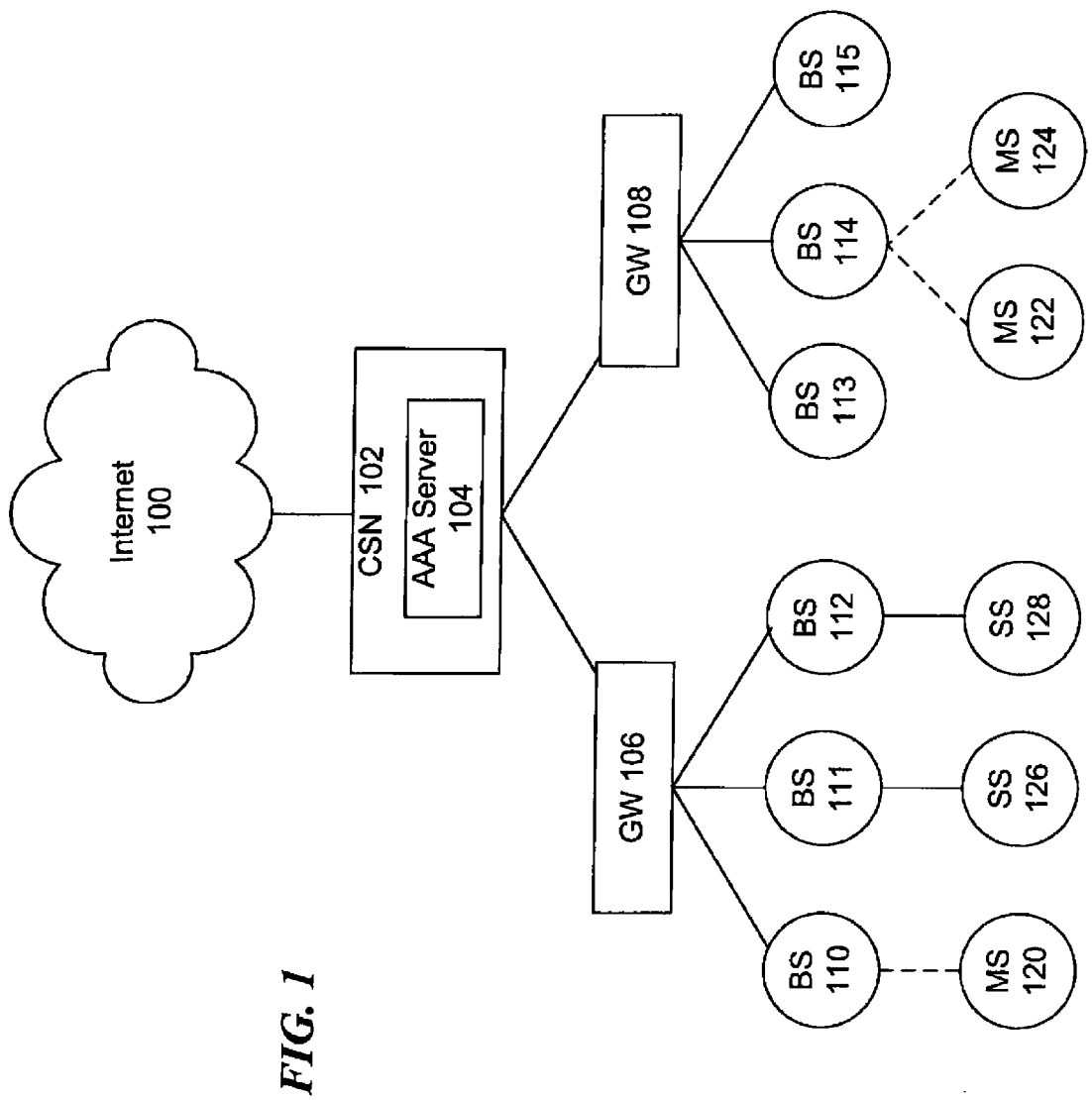
FIG. 1 is a block diagram of an exemplary prior art wireless communication system for use in an IEEE 802.16d/802.16e WiMAX wireless communication system.
Figure 2:
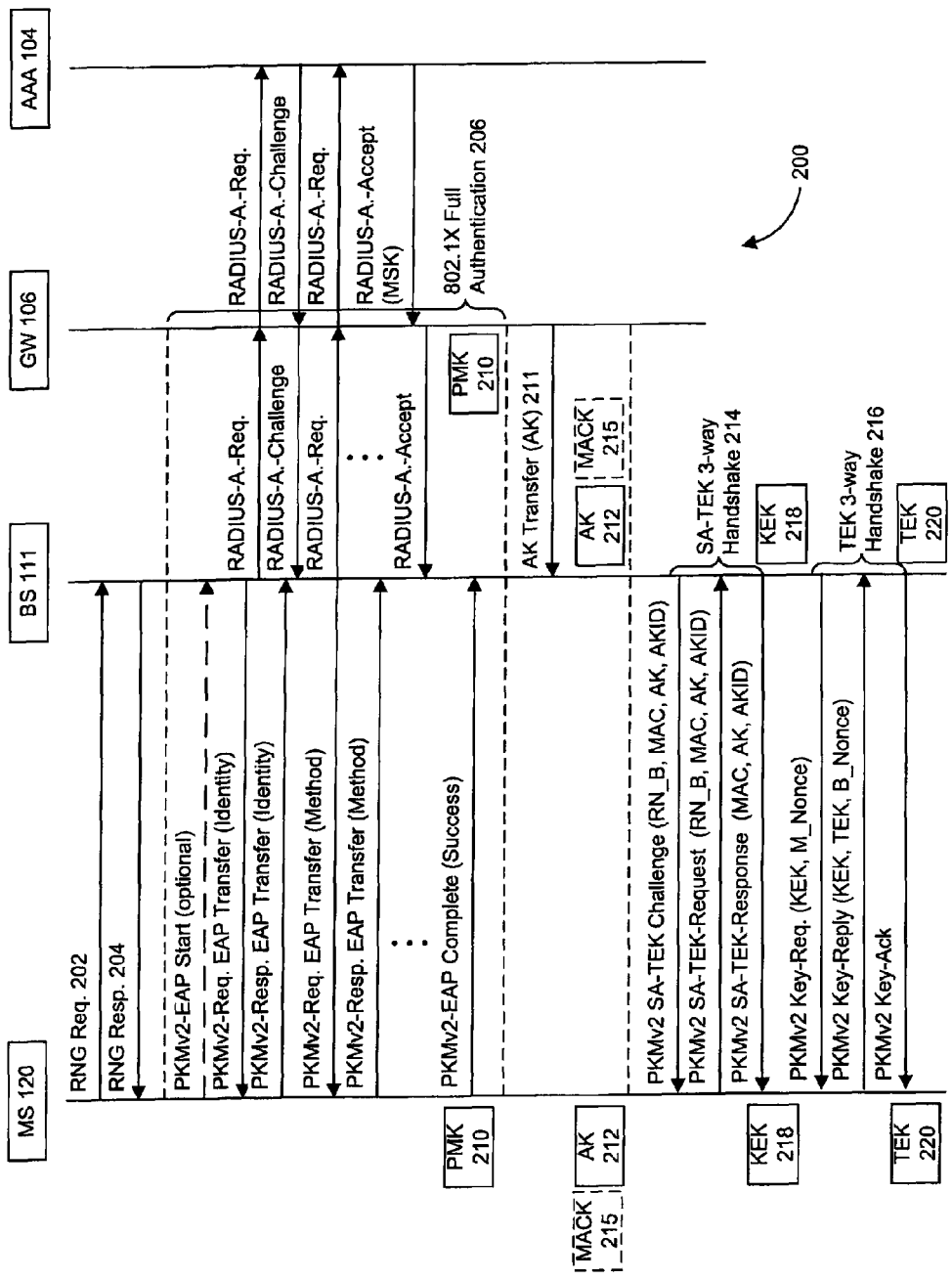
FIG. 2 is a signaling diagram of exemplary prior art authentication and authorization in an IEEE 802.16d and 802.16e WiMAX wireless communication system.
Figure 3:
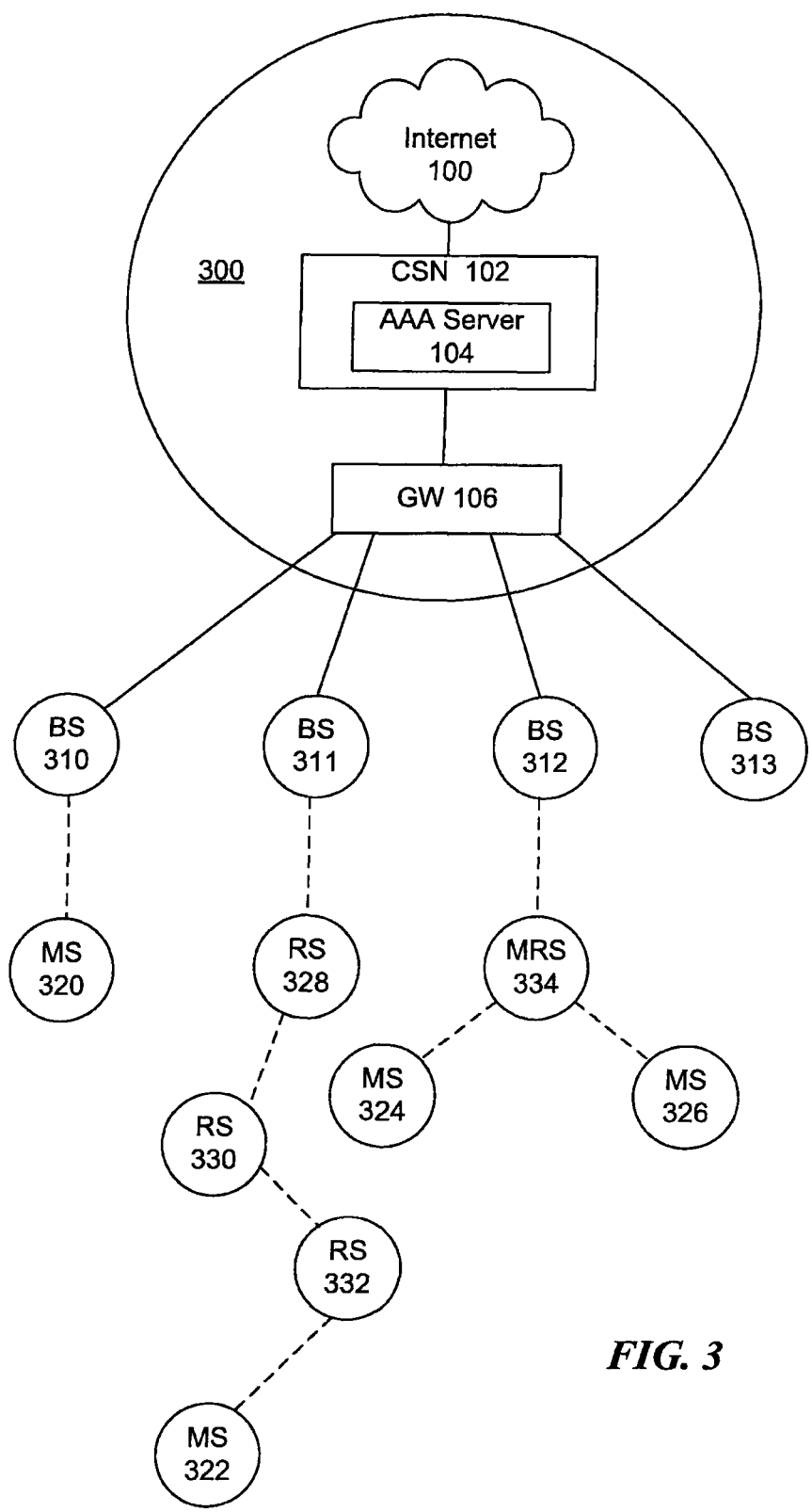
FIG. 3 is a block diagram of an exemplary prior art wireless communication system for use in an IEEE 802.16j wireless communication system with multi-hop relaying architecture.
Figure 4:
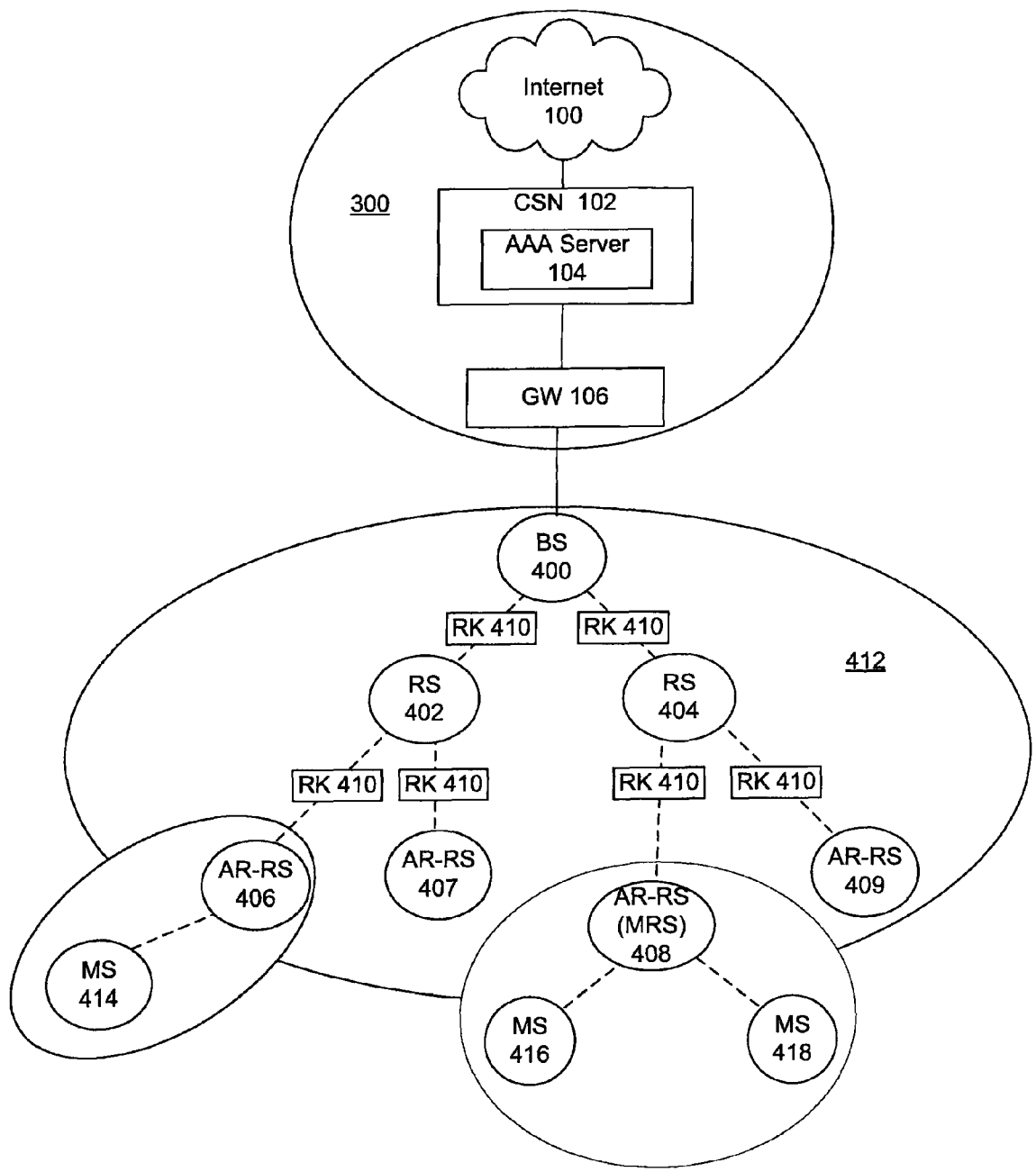
FIG. 4 is a block diagram of an exemplary wireless communication system for use in an IEEE 802.16j wireless communication system in which selected relay stations serve as authenticator relay-relay stations.

FIG. 4 is a block diagram of an exemplary wireless communication system for use in an IEEE 802.16j WiMAX wireless communication system in which selected relay stations serve as authenticator relay-relay stations (AR-RSs). In FIG. 4, a base station 400 is connected over a wire to network 300 and communicates wirelessly with one or more relay stations 402 and 404, which boost and relay the received signal to AR-RSs 406-409. As shown in FIG. 4, AR-RS 408 is a mobile relay station. A relay key (RK) 410 is distributed by base station 400 to selected relay stations within the area of coverage for base station 400, for example, relay stations 402 and 404, and AR-RSs 406-409 after relay stations 402 and 404, and AR-RSs 406-409 are authenticated during their initialization to network 300. Relay key (RK) 410 is used to provide data and signal protection and can be used to protect data and/or management messages for the communication channels between relay stations and/or between relay stations and base stations in an IEEE 802.16j network. The area of network coverage provided by base station 400, relay stations 402 and 404, and AR-RSs 406-409 that hold a common particular type of relay key 410, called a security zone key, may be called a secure relay zone (SRZ) 412. FIG. 4 illustrates a single mobile station 414 served by AR-RS 406 and two mobile stations 416 and 418 are served by AR-RS 408, but the network needs of several mobile stations may be provided by a single AR-RS. In addition, although only AR-RS 408 is shown as a mobile relay station, additional AR-RSs within SRZ 412 may be mobile relay stations.

Each time mobile station 414 is initially served by base station 400, it is necessary to establish a security association with network 300. So long as mobile station 414 moves within SRZ 412, it may be possible to bypass further security association establishment and authentication. However, if mobile station 414 moves to an area served by a different base station, mobile station 414 is handed over to the different base station, so that it may be necessary for that different base station to establish another security association with mobile station 414, and, depending upon whether the different base station is connected through gateway 106, authenticate mobile station 414 as part of the handoff processing. Such reauthentication and/or security association establishment introduces delay in providing service to mobile station 414.

Figure 5A:
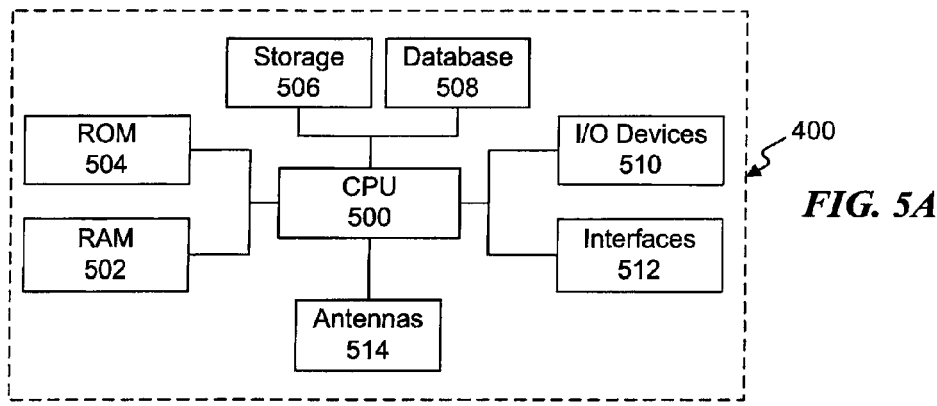
FIG. 5a is a block diagram illustrating an exemplary construction of a base station.

FIG. 5a is a block diagram illustrating an exemplary construction of a base station such as base station 400. Base station 400 may be any type of communication device configured to transmit and/or receive data and/or communications to and from one or more mobile stations such as mobile station 414, relay stations such as relay stations 402 and 404, and/or AR-RSs such as AR-RSs 406-409, in a wireless communication system. As shown in FIG. 5a, each base station 400 may include one or more of the following components: at least one central processing unit (CPU) 500 configured to execute computer program instructions to perform various processes and methods, random access memory (RAM) 502 and read only memory (ROM) 504 configured to access and store information and computer program instructions, memory 506 to store data and information, database 508 to store tables, lists, or other data structures, I/O devices 510, interfaces 512, antennas 514, etc. Each of these components is well-known in the art and will not be discussed further.

Figure 5B:
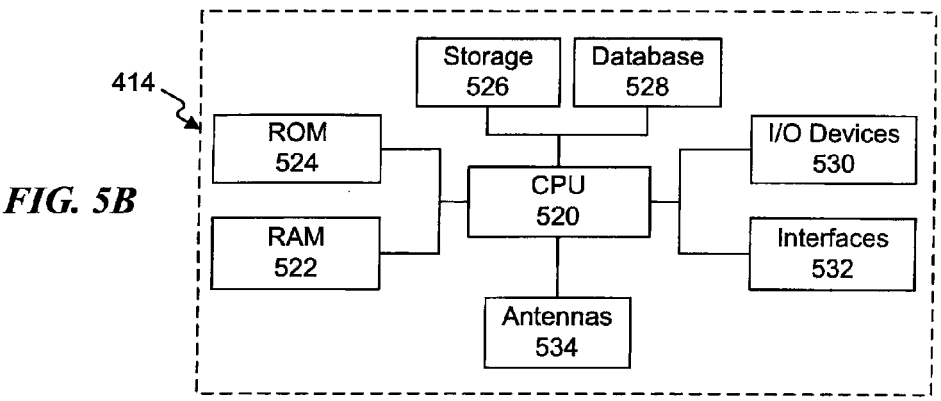
FIG. 5b is a block diagram illustrating an exemplary construction of a mobile station.

FIG. 5b is a block diagram illustrating an exemplary construction of a mobile station such as mobile station 414. As shown in FIG. 5b, each mobile station 414 may include one or more of the following components: at least one CPU 520 configured to execute computer program instructions to perform various processes and methods, RAM 522 and ROM 524 configured to access and store information and computer program instructions, memory 526 to store data and information, database 528 to store tables, lists, or other data structures, I/O devices 530, interfaces 532, antennas 534, etc. Each of these components is well-known in the art and will not be discussed further.

Figure 5C:
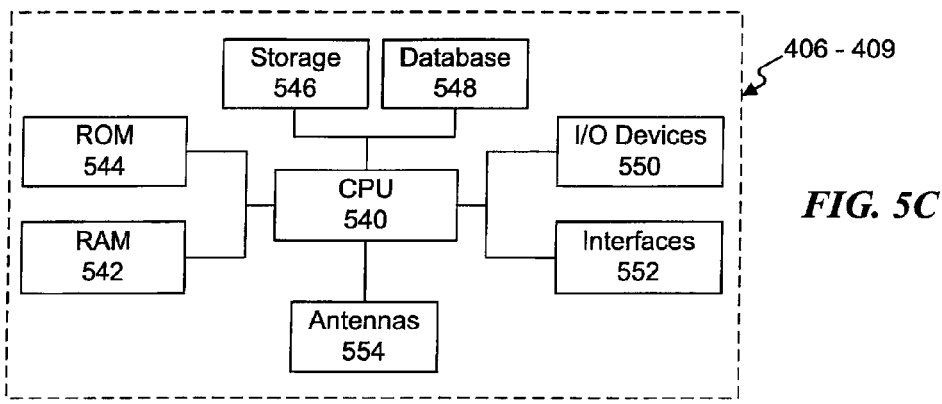
FIG. 5c is a block diagram illustrating an exemplary construction of a relay station or mobile relay station.

FIG. 5c is a block diagram illustrating an exemplary construction of a relay station or mobile relay station such as AR-RS/mobile relay station 406. As shown in FIG. 5c, each relay station/mobile relay station 406 may include one or more of the following components: at least one CPU 540 configured to execute computer program instructions to perform various processes and methods, random access memory RAM 542 and read only memory ROM 544 configured to access and store information and computer program instructions, memory 546 to store data and information, database 548 to store tables, lists, or other data structures, I/O devices 550, interfaces 552, antennas 554, etc. Each of these components is well-known in the art and will not be discussed further.

I. INITIALIZATION

Figure 6:
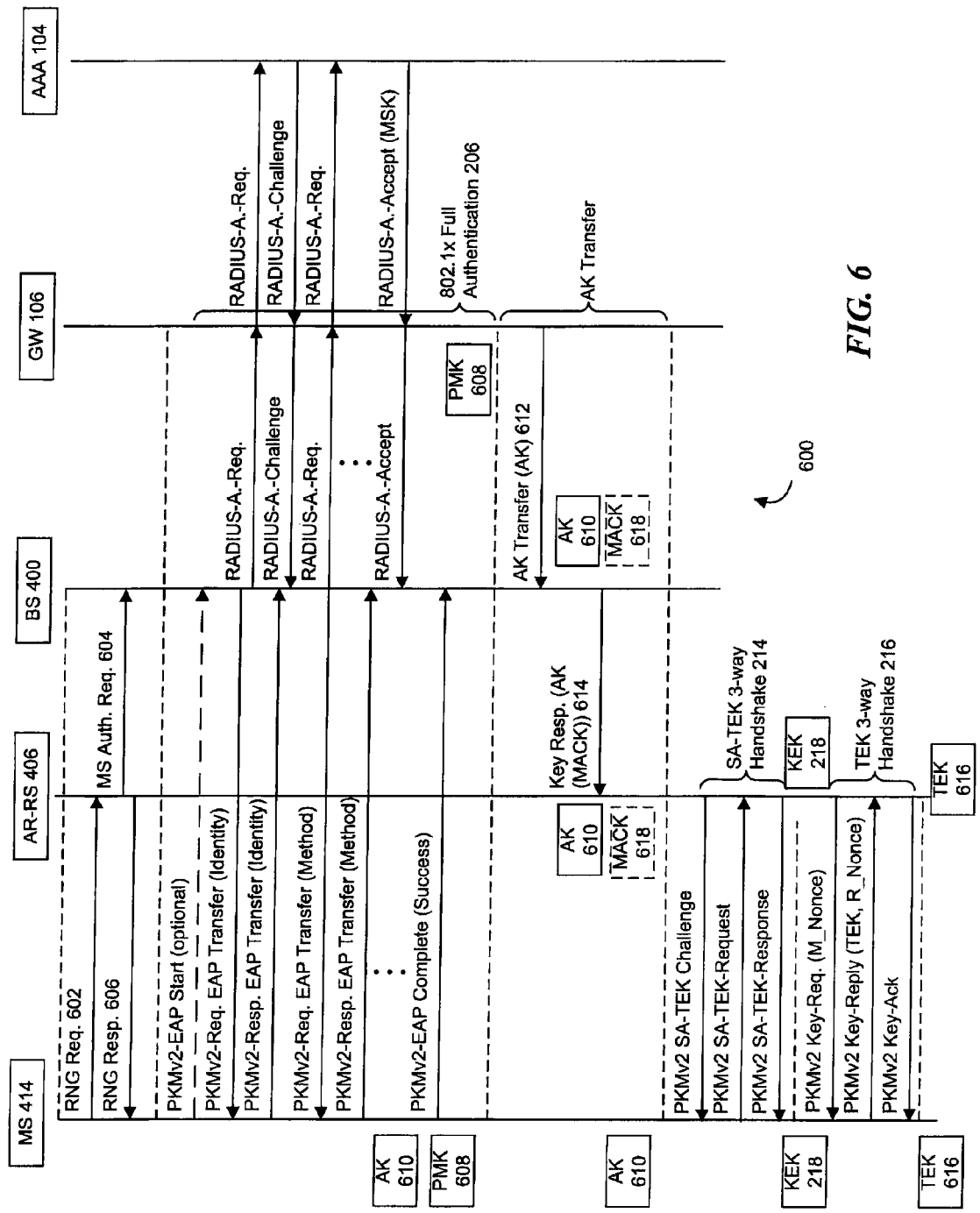
FIG. 6 is a signaling diagram of exemplary authentication and authorization in an IEEE 802.16j wireless communication system in which selected relay stations serve as authenticator relay-relay stations.

FIG. 6 is a signaling diagram of exemplary authentication and authorization in an IEEE 802.16j WiMAX wireless communication system in which selected relay stations serve as authenticator relay-relay stations. An initialization process 600 is used to ensure that a mobile station requesting network service is authorized to access network 300 and to provide a security association between mobile stations, relay stations and AR-RSs for secure message transmission. For example, process 600 may be used to authenticate and establish a security association with mobile station 414 just after it is turned on, or after it has moved into the coverage area provided by AR-RS 406 from a coverage area provided through a base station connected to gateway 108. First, in accordance with the IEEE 802.16 protocol, mobile station 414 sends a signaling message such as ranging request 602 to AR-RS 406 to indicate that mobile station 414 is within range of AR-RS 406. Next, again in accordance with IEEE 802.16 protocol, AR-RS 406 requests authentication from base station 400 through a mobile station authentication request 604 and transmits a ranging response 606 to mobile station 414 to confirm the signal range of mobile station 414 and receipt of the ranging request 602. Because mobile station 414 has not previously or recently been connected to network 300 through base station 400 and gateway 106, mobile station 414 performs IEEE 802.1X full authentication 206 with AAA server 104. As a result of IEEE 802.1X full authentication protocol 206, gateway 106 will receive an MSK from AAA server 104 and then derive and store PMK 608 and a master key, such as AK 610, from the MSK for mobile station 414. A master key, such as AK 610, is a key from which other security material and/or security keys can be derived. Next gateway 106 transfers AK 610 to base station 400 securely. After receiving AK 610 from gateway 106, base station 400 may transfer AK 610 to AR-RS 406 directly for establishing a security association between mobile station 414 and relay station 406. Mobile station 414 may calculate MSK, PMK 608 and AK 610 by itself.

In one exemplary embodiment, to allow AR-RS 406 to perform future authentication protocols and to establish a security association with mobile station 414, base station 400 transmits key response 614, which includes AK 610, to AR-RS 406. The AR-RS 406 may derive KEK 218 and a verification key such as MACK 618 from the AK 610 first. Then the AR-RS 406 may perform SA-TEK 3-way handshake procedure 214 locally, protected by MACK 618, with the mobile station 414. When the SA-TEK 3-way handshake procedure 214 is successfully completed, the AR-RS 406 may generate a random number to use as a TEK 616 and securely transfer the traffic key, such as TEK 616, protected by KEK 218, to mobile station 414. Finally, AR-RS 406 and mobile station 414 may utilize TEK 616 to protect data transmission between them and MACK 618 to authenticate each other.

FIG. 6 illustrates exemplary authentication and authorization in an IEEE 802.16j wireless communication system in which selected relay stations serve as AR-RSs. One of skill in the art will appreciate that the AR-RS in FIG. 6 could be a mobile relay station such as AR-RS 408. One of skill in the art will also appreciate that instead of sending AK 610 to AR-RS 406, base station 400 may send different security material to mobile stations such as AR-RS 406. For example, upon receiving AK 610, base station 400 may generate MACK 618 using AK 610 and send MACK 618 to relay station 406 instead of sending AK 610. Relay station 406 may use MACK 618 to authenticate, or verify the identity of mobile stations. Mobile station 414 and AR-RS 406 can check the MAC inside the payload, or data component of a MAC packet to authenticate each other, and thereby identify each other.

II. INTRA-BASE STATION HANDOFFS

Figure 7:
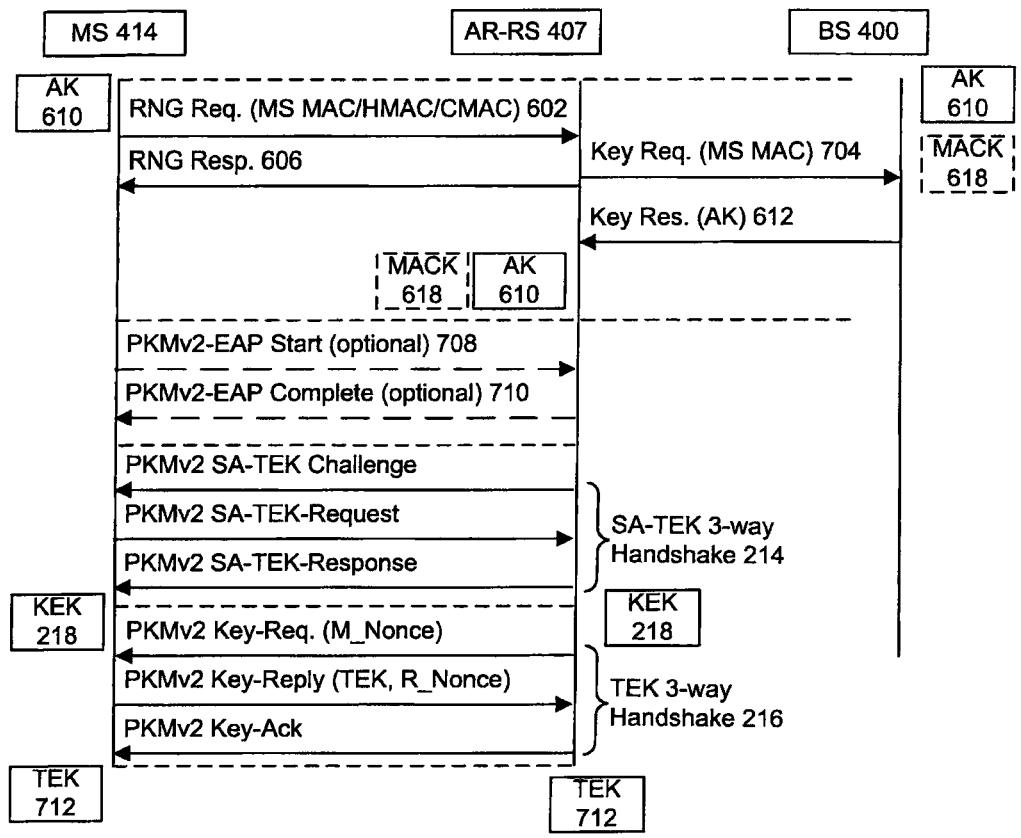
FIG. 7 is a signaling diagram of an exemplary mobile station handoff between a current authenticator relay-relay station and a target authenticator relay-relay station that are connected to the same base station where the target authenticator relay-relay station does not currently hold a required authentication key.

FIG. 7 is a signaling diagram of an exemplary mobile station handoff between a current AR-RS and a target AR-RS that are connected to the same base station where the target AR-RS does not currently hold the required AK. A handoff process 700 is used to ensure that a mobile station requesting network service from a target AR-RS is authorized to access the network and to provide a security association between mobile stations and AR-RSs to allow secure message transmission. For example, handoff process 700 may be used to handoff mobile station 414, which has been previously authenticated using AR-RS 406 through the process described above in FIG. 6, from AR-RS 406 to AR-RS 407, where AR-RS 407 does not currently have the AK associated with mobile station 414, i.e., AK 610, in its memory (e.g., memory 546, ROM 544, RAM 542 or database 548), but both AR-RS 406 and AR-RS 407 are connected to network 300 through base station 400.

In handoff process 700, mobile station 414 first sends a signaling message such as a ranging request 602 to AR-RS 407 to indicate that mobile station 414 is within the coverage area of AR-RS 407. Ranging request 602 may include security material identification such as a mobile station message authentication code, HMAC and/or CMAC, which identifies mobile station 414 as the requesting mobile station. Alternatively, ranging request 602 may include, for example, an AKID. Each of AKID, MS MAC, HMAC, and/or CMAC provide AR-RS 407 with identification information for mobile station 414 and can be used to request AK 610 from base station 400 if AR-RS 407 does not hold AK 610. For example, if an AKID is included, AR-RS 407 may decide to authenticate the corresponding mobile station if AR-RS 407 holds the active AK, or, if AR-RS 407 does not hold the active AK, can request the active AK from base station 400. If an AKID is not included in ranging request 602, other security material identification can be used to verify the AK held by mobile station 414. Because AR-RS 407 does not currently have AK 610 in its memory (e.g., memory 546, ROM 544, RAM 542 or database 548), AR-RS 407 transmits a key request 704 to base station 400. Key request 704 includes a MAC/HMAC/CMAC corresponding to mobile station 414. AR-RS 407 transmits a ranging response 606 to mobile station 414 to confirm the presence of mobile station 414 and receipt of ranging request 602.

Upon receiving key request 704, base station 400 verifies the credentials of mobile station 414. Base station 400 may retrieve AK 610 from its memory (e.g., memory 506, ROM 504, RAM 502 or database 508), and because mobile station 414 has previously undergone IEEE 802.1X full authentication 206 with mobile station 414 to obtain AK 610 when mobile station 414 was connected to AR-RS 406, it is not necessary for base station 400 and mobile station 414 to again undergo this process. As such, base station 400 transmits a key response 612 that includes AK 610 to AR-RS 407, thereby granting AR-RS 406 the authority to further authenticate and securely communicate with mobile station 414.

Upon receipt of the ranging response 606, the mobile station 414 may attempt to initiate authentication using extended authentication protocol (EAP) to begin IEEE 802.1X full authentication 206. If AR-RS 407 receives such a request, for example a privacy key management extended authentication protocol (PKM-EAP), which supports IEEE 802.16d, or a PKMv2-EAP, which supports IEEE 802.16e, start request 708, AR-RS 407 may transmit a PKMv2-EAP complete message 710 to mobile station 414 that indicates to mobile station 414 that IEEE 802.1X full authentication 206 is successful without actually undergoing IEEE 802.1X full authentication 206.

After AR-RS 407 has AK 610, it may perform SA-TEK 3-way handshake 214 and/or TEK 3-way handshake 216 with mobile station 414 to establish a secure connection with mobile station 414. During TEK 3-way handshake 216, AR-RS 407 may transmit to the mobile station 414 a new traffic key such as TEK 712, generated by AR-RS 407 and encrypted using KEK 218. AR-RS 407 and mobile station 414 may then communicate over a secure communication channel.

Figure 8:
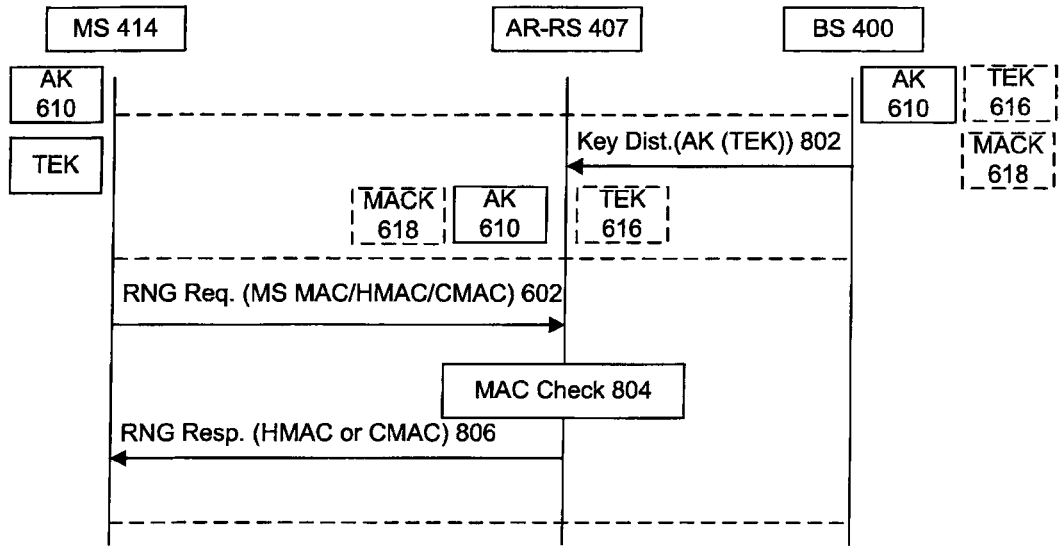
FIG. 8 is a signaling diagram of an exemplary mobile station handoff between a current authenticator relay-relay station and a target authenticator relay-relay station that are connected to the same base station where the target authenticator relay-relay station receives an authentication key through unsolicited key pre-distribution.

FIG. 8 is a signaling diagram of an exemplary mobile station handoff between a current AR-RS and a target AR-RS that are connected to the same base station where the target AR-RS receives the AK through unsolicited key pre-distribution. As shown in FIG. 8, base station 400 receives an indication that mobile station 414 is about to enter or has recently entered the coverage area of AR-RS 407. Base station 400 may receive this indication from another base station or from gateway 106 through BS-BS or BS-gateway communication using additional signaling messages or a prediction technique such as a global position system (GPS). Because mobile station 414 has previously undergone IEEE 802.1X full authentication 206 to obtain AK 610 when mobile station 414 was connected to AR-RS 406, it is not necessary for base station 400 and mobile station 414 to again undergo this process. As such, base station 400 transmits an unsolicited key pre-distribution signal 802 that includes AK 610 and, optionally, TEK 616, to AR-RS 407, thereby granting AR-RS 407 the authority to authenticate and provide secure communication with mobile station 414. This may occur before or in place of mobile station 414 sending a signaling message and AR-RS 407 transmitting a key request. Then, when mobile station 414 sends ranging request 602, AR-RS 407 already holds AK 610 and may simply perform a MAC check 804 to verify the key held by mobile station 414 and thereby verify the identity of mobile station 414. AR-RS 407 may then send ranging response 806 that includes HMAC or CMAC.

In an exemplary embodiment as shown in FIG. 8, a handoff between a current AR-RS and a target AR-RS has improved efficiency through the elimination of not only IEEE 802.1X full authentication but also SA-TEK 3-way handshake 214 and TEK 3-way handshake 216. SA-TEK 3-way handshake 214 and TEK 3-way handshake 216 can be eliminated for previously authenticated mobile stations by providing an AR-RS with the TEK for these previously authenticated mobile stations. Specifically, in one embodiment, a target AR-RS may receive a TEK from the current AR-RS that has previously created a TEK for transmission with mobile station 414; in another embodiment a target AR-RS may receive a TEK from the base station, which has either previously created the base station through direct transmission with the mobile station or which has received a TEK from a previous AR-RS. Thus, as shown in FIG. 8, base station 400 can send TEK 616 to AR-RS 407 either as part of unsolicited key pre-distribution 802 or through a separate transmission. Alternatively, AR-RS 407 may receive TEK 616 from AR-RS 407. If AR-RS 407 holds TEK 616, it can skip SA-TEK 3-way handshake 214 and TEK 3-way handshake 216 to thereby improve the efficiency the handoff from AR-RS 407. Once AR-RS 407 obtains a TEK, either from AR-RS 407, base station 400, or by generating a new TEK itself through SA-TEK 3-way handshake 214 and TEK 3-way handshake 216, AR-RS may then provide secure communications with mobile station 414, where the data is encrypted using the TEK.

Figure 9:
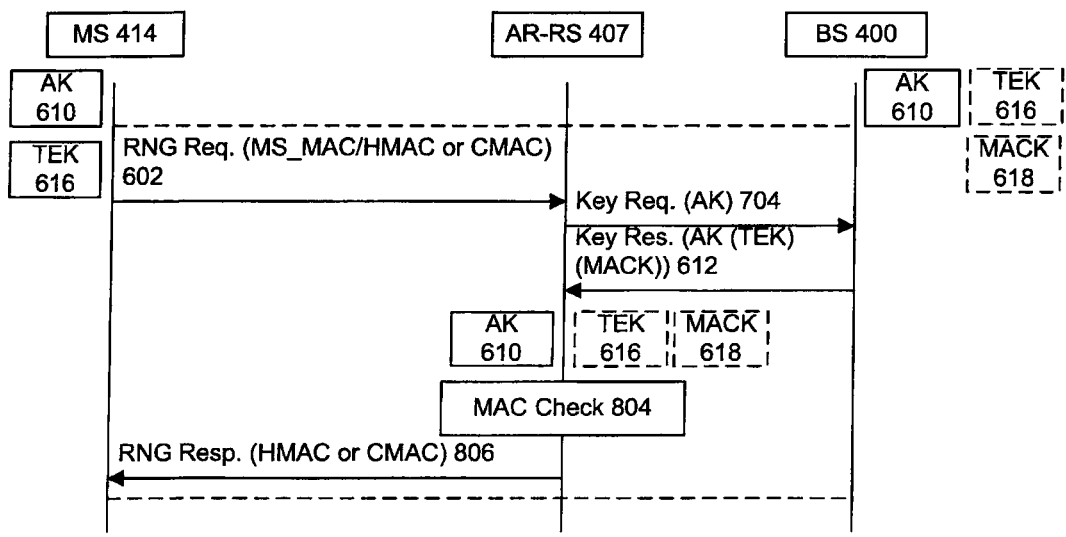
FIG. 9 is a signaling diagram of an exemplary mobile station handoff between a current authenticator relay-relay station and a target authenticator relay-relay station that are connected to the same base station where the target authenticator relay-relay station receives an authentication key through on-demand key distribution.

FIG. 9 is a signaling diagram of an exemplary mobile station handoff between a current AR-RS and a target AR-RS that are connected to the same base station where the target AR-RS receives the AK through on-demand key distribution. As shown in FIG. 9, mobile station 414 transmits a signaling message such as ranging request 602 to AR-RS 407 and upon receiving key request 704, base station 400 verifies the credentials of mobile station 414. Because mobile station 414 has previously undergone IEEE 802.1X full authentication 206 to obtain AK 610, it is not necessary for base station 400 and mobile station 414 to again undergo this process. As such, base station 400 transmits a key response 612 that includes AK 610 and, optionally, TEK 616, to AR-RS 407, thereby granting AR-RS 407 the authority to authenticate and provide secure communication with mobile station 414. Then, AR-RS 407 may simply perform a MAC check 804 to verify the key held by mobile station 414 and thereby verify the identity of mobile station 414. AR-RS 407 may then send ranging response 806 that includes HMAC or CMAC to mobile station 414.

As discussed above in connection with FIG. 8, if AR-RS 407 received TEK 616 from base station 400, or alternately, received TEK 616 from AR-RS 406, AR-RS 407 can skip SA-TEK 3-way handshake 214 and TEK 3-way handshake 216 to thereby improve the efficiency of the handoff from AR-RS 407.

Figure 10:
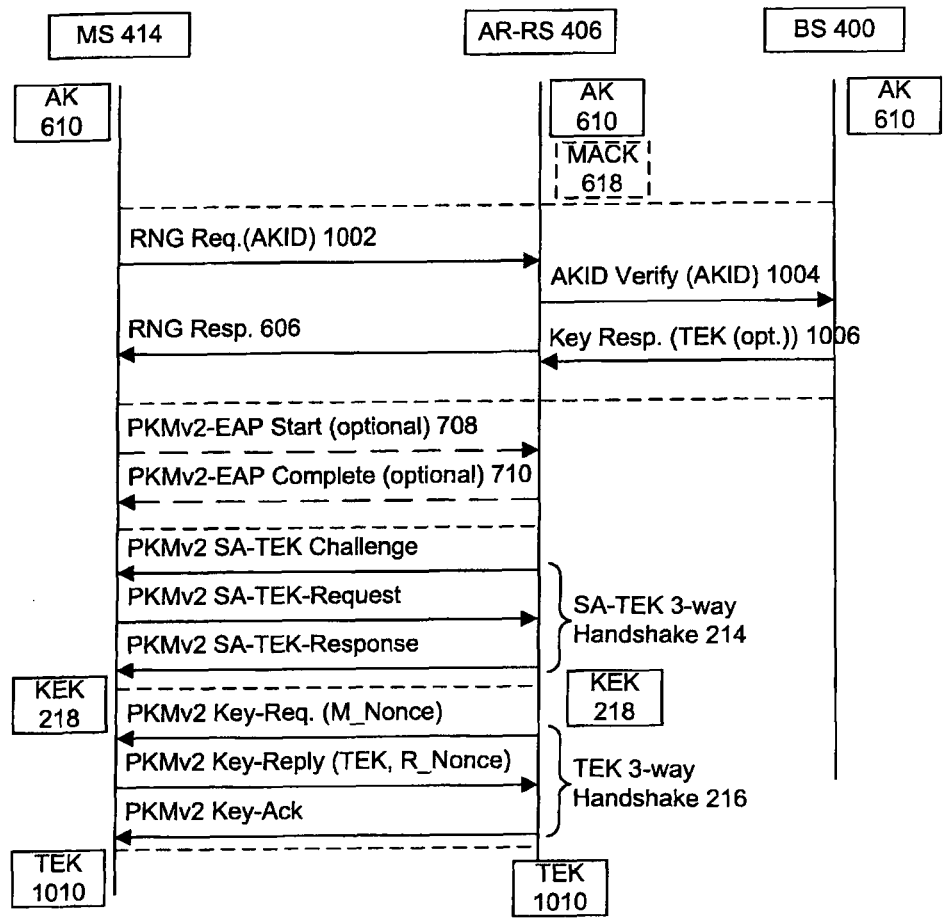
FIG. 10 is a signaling diagram of an exemplary mobile station handoff between a current authenticator relay-relay station and a target authenticator relay-relay station that are connected to the same base station where the target authenticator relay-relay station currently has an authentication key corresponding to the mobile station being handed off.

FIG. 10 is a signaling diagram of an exemplary mobile station handoff between a current AR-RS and a target AR-RS that are connected to the same base station where the target AR-RS currently has the AK corresponding to the mobile station being handed off. For example, if mobile station 414 authenticates with AR-RS 406 as described for FIG. 6, leaves the coverage area of AR-RS 406 and enters the coverage area of AR-RS 407, and then returns to the coverage area of AR-RS 406, AR-RS 406 may still hold AK 610 in its memory (e.g., memory 546, ROM 544, RAM 542 or database 548). Thus, when mobile station 414 sends a signaling message such as a ranging request 1002 that includes an authentication key identification (AKID) corresponding to AK 610, AR-RS 406 sends an AKID Verify request 1004 to base station 400 to confirm the location of mobile station 414.

Upon receiving the AKID Verify request 1004, base station 400 verifies the location of mobile station 414. Because mobile station 414 has previously undergone IEEE 802.1X full authentication 206 to obtain AK 610, it is not necessary for base station 400 and mobile station 414 to again undergo this process. As such, base station 400 transmits a key response 1006 that includes AK 610 to AR-RS 407 if AR-RS 406 holds AK 610, thereby granting AR-RS 407 the authority to authenticate and establish a security association with mobile station 414. If AR-RS 406 does not hold AK 610 or if it AR-RS 406 needs to confirm that it holds the proper AK 610, AR-RS 406 can send RNG Response 606 after receiving key response 1006 from base station 400.

Upon receipt of the ranging response 1008, the mobile station 414 may attempt to initiate extended authorization protocol to begin IEEE 802.1X full authentication as described above in connection with FIG. 7. As described above, because AR-RS 407 already has AK 610, AR-RS 407 may transmit an extended authorization protocol complete message to mobile station 414 without actually undergoing the processing for IEEE 802.1X authentication.

When AR-RS 407 has AK 610, it may perform one or both of SA-TEK 3-way handshake 214 and TEK 3-way handshake 216 with mobile station 414 to prepare for data transmission. As shown in FIG. 10, AR-RS 407 may create a new TEK 1010 to encrypt the data transmitted between the AR-RS 407 and the mobile station 120 after the mobile station 120 has been authenticated. As described above, if AR-RS 406 already has TEK 616, AR-RS 406 can skip SA-TEK 3-way handshake 214 and TEK 3-way handshake 216 to thereby improve the efficiency of the handoff from AR-RS 407 and establish a secure association between AR-RS 406 and mobile station 414.

Figure 11:
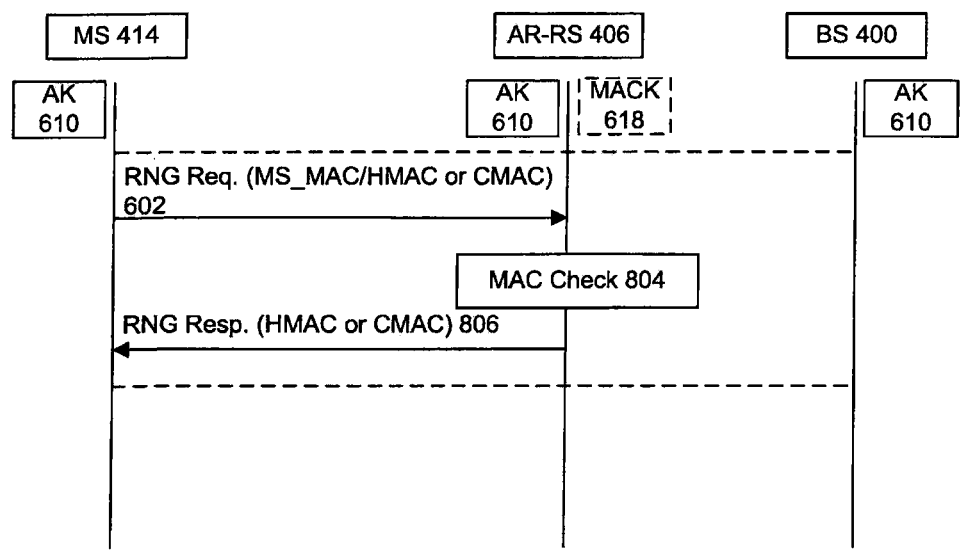
FIG. 11 is a signaling diagram of an exemplary mobile station handoff between a current authenticator relay-relay station and a target authenticator relay-relay station that are connected to the same base station where the target authenticator relay-relay station currently has an authentication key AK corresponding to the mobile station being handed off.

FIG. 11 is a signaling diagram of an exemplary mobile station handoff between a current AR-RS and a target AR-RS that are connected to the same base station where the target AR-RS currently has the AK corresponding to the mobile station being handed off. In such an improved-efficiency handoff, when mobile station 414 sends ranging request 602, AR-RS 406 already holds AK 610 and may simply perform a MAC check 804 to verify the key held by mobile station 414 and thereby verify the identity of mobile station 414. AR-RS 406 may then send ranging response 806 that includes HMAC or CMAC.

Figure 12:
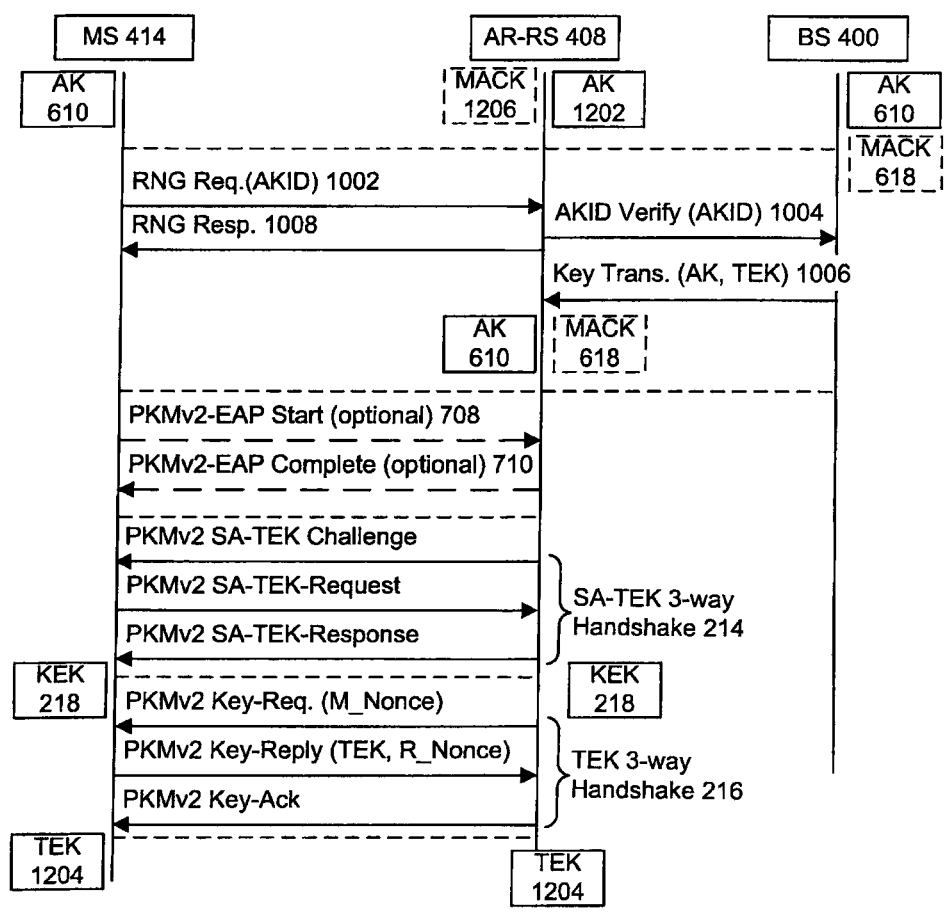
FIG. 12 is a signaling diagram of an exemplary mobile station handoff between a current authenticator relay-relay station and a target authenticator relay-relay station that are connected to the same base station where the target authenticator relay-relay station currently has an authentication key that does not correspond to the mobile station being handed off.

FIG. 12 is a signaling diagram of an exemplary mobile station handoff between a current AR-RS and a target AR-RS that are connected to the same base station where the target AR-RS currently has an AK that does not correspond to the mobile station being handed off. For example, mobile station 414 may enter the coverage area of AR-RS 408 when AR-RS 408 holds an AK 1202, which corresponds to a mobile station other than mobile station 414, but not AK 610, corresponding to mobile station 414, stored in its memory (e.g., memory 546, ROM 544, RAM 542 or database 548). Thus, when AR-RS 407 sends an AKID Verify request 1004 to base station 400 to confirm the location of mobile station 414, base station 400 responds with the correct AK corresponding to mobile station 414, i.e., AK 610.

Upon receipt of ranging response 1008, mobile station 414 may attempt to initiate extended authorization protocol to begin IEEE 802.1X full authentication as described above in connection with FIG. 7. As described above, because AR-RS 408 now has AK 610, AR-RS 408 may transmit an extended authorization protocol complete message to mobile station 414 without actually undergoing the processing for IEEE 802.1X authentication.

When AR-RS 408 has AK 610, it may perform one or both of SA-TEK 3-way handshake 214 and TEK 3-way handshake 216 with mobile station 414 to prepare for data transmission. As shown in FIG. 10, AR-RS 408 may create a new traffic key such as TEK 1204 to encrypt the data transmitted between the AR-RS 408 and the mobile station 120 after the mobile station 120 has been authenticated.

Figure 13:
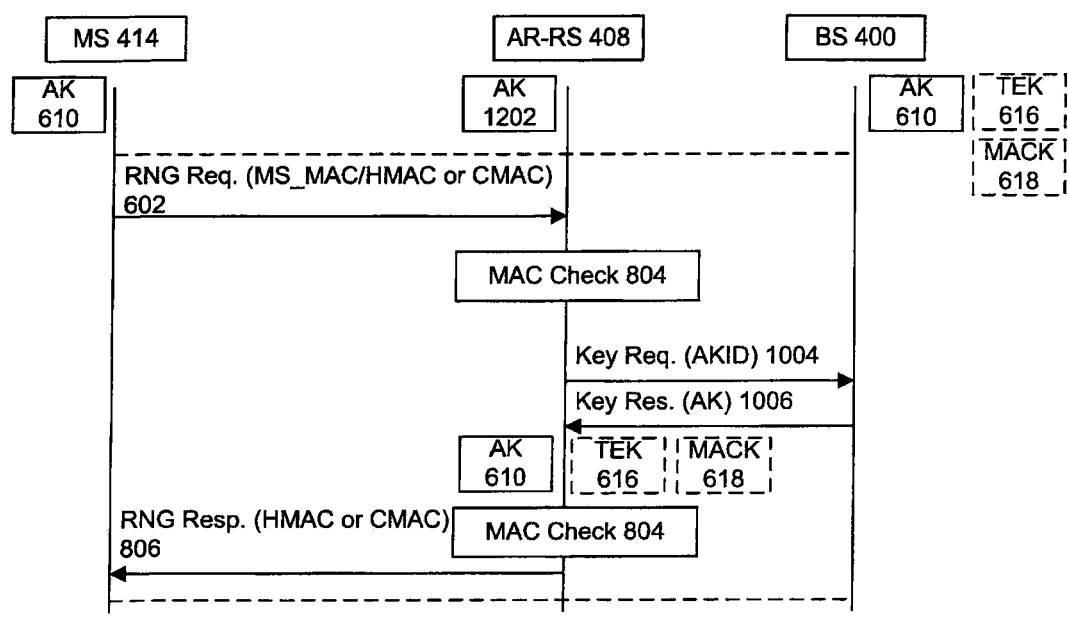
FIG. 13 is a signaling diagram of an exemplary mobile station handoff between a current authenticator relay-relay station and a target authenticator relay-relay station that are connected to the same base station where the target authenticator relay-relay station currently has an authentication key that does not correspond to the mobile station being handed off.

FIG. 13 is a signaling diagram of an exemplary mobile station handoff between a current AR-RS and a target AR-RS that are connected to the same base station where the target AR-RS currently has an AK that does not correspond to the mobile station being handed off. When mobile station 414 sends a signaling message such as ranging request 602, AR-RS 408 holds AK 1202 and when AR-RS 408 performs a MAC check 804 to verify the key held by mobile station 414 and thereby verify the identity of mobile station 414, the MAC check is unsuccessful. When AR-RS 408 sends AKID Verify request 1004 to base station 400 to confirm the location of mobile station 414, base station 400 responds with the proper AK, i.e., AK 610. AR-RS 408 may then send ranging response 806 that includes HMAC or CMAC. If AR-RS 408 already has TEK 616, AR-RS 408 can skip SA-TEK 3-way handshake 214 and TEK 3-way handshake 216.

FIGS. 7-13 illustrate exemplary mobile station handoffs between a current AR-RS and a target AR-RS that are connected to the same base station. Although the scenarios described above in connection with FIGS. 12 and 13 are described in the context of a mobile station, i.e., AR-RS 408, one of skill in the art will appreciate that the current AR-RS or the target AR-RS in FIGS. 12 and 13 could be a fixed relay station. One of skill in the art will also appreciate that the current AR-RS or the target AR-RS in each of the scenarios illustrated above in connection with FIGS. 7-11 could be a mobile relay station such as AR-RS 408.

One of skill in the art will also appreciate that, in each of the scenarios illustrated above in connection with FIGS. 7-13, instead of sending AK 610 to AR-RS 406-409, base station 400 may send different security material to relay stations. For example, base station 400 may generate a verification key, such as MACK 618, and a traffic key, such as TEK 616, using AK 610, and pre-distribute the verification key and traffic key to relay station 407 instead of sending AK 610.

Similarly, upon receipt of key request 704, base station 400 may generate a verification key, such as MACK 618 using AK 610 and send the MACK to AR-RS 407 at key response 612 for use in MAC Check 804. In addition, if AR-RS 406 already has MACK 618 corresponding to mobile station 414 in its memory (e.g., memory 546, ROM 544, RAM 542 or database 548), upon receiving a signaling message such as a ranging request 602, AR-RS 406 may perform a MAC check 804; if relay station 406 has the wrong MACK 1206 in its memory, upon receiving a signaling message such as a ranging request 602 AR-RS 408 can transmit an AKID verify signal 1004 and receive MACK 618 in key transfer 1008 from base station 400.

AR-RSs 405-409 may use MACK 618 to authenticate, or verify the identity of mobile stations as part of MAC Check 804. Mobile station 414 and AR-RSs 405-409 may check the MAC inside the payload, or data component of a MAC packet, to authenticate each other, or in other words, to identify each other.

III. INTER-BASE STATION HANDOFFS

Figure 14:
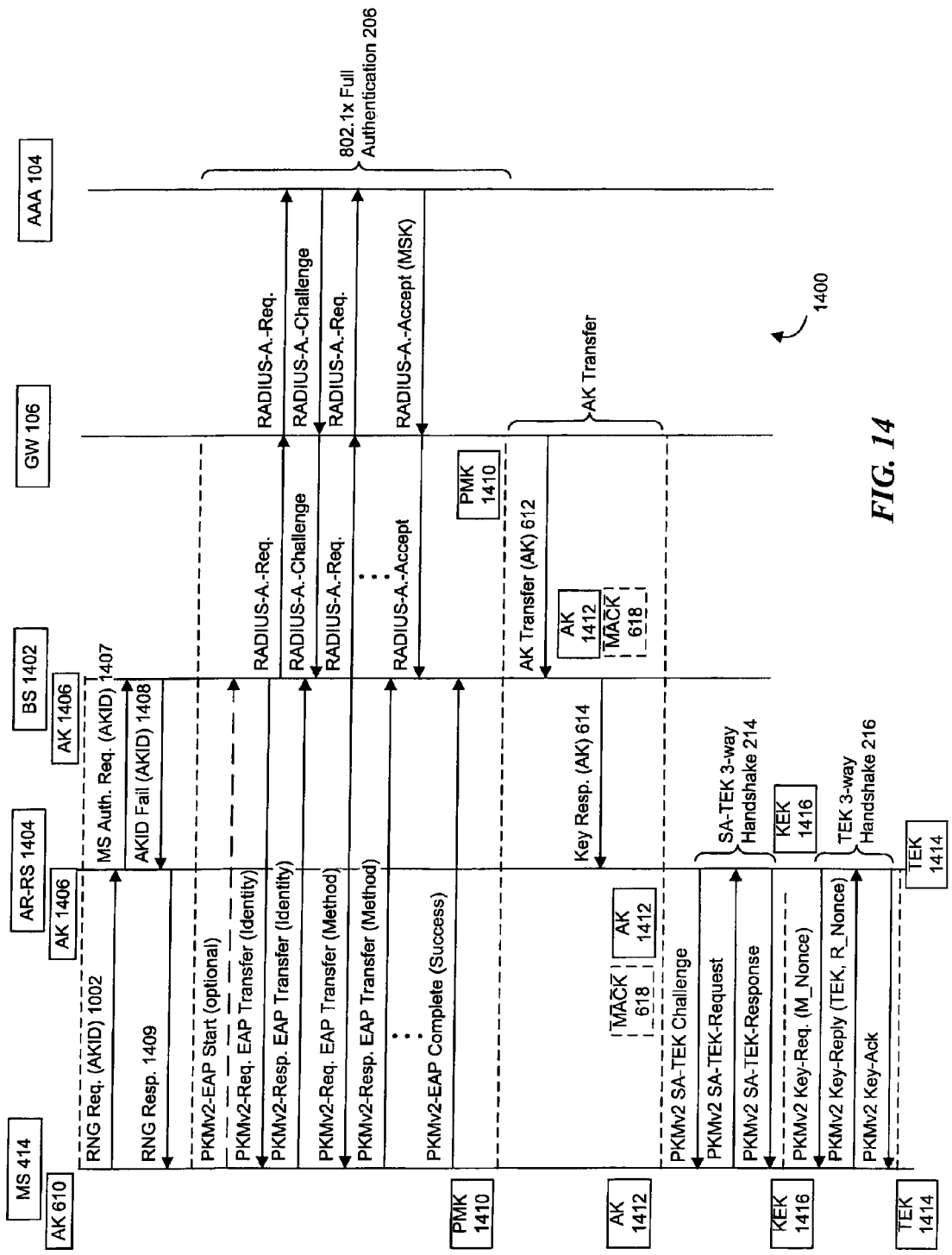
FIG. 14 is a signaling diagram of an exemplary mobile station handoff between a current authenticator relay-relay station and a target authenticator relay-relay station that are connected to different base stations.

FIG. 14 is a signaling diagram of an exemplary mobile station handoff between a current AR-RS and a target AR-RS that are connected to different base stations. An initialization process 1400 is used to ensure that a mobile station requesting network service is authorized to access network 300 and to provide a security association between mobile stations and AR-RSs to allow secure message transmission. For example, process 1400 may be used to authenticate and authorize mobile station 414 just after it moved from AR-RS 408 into the coverage area provided by a target base station 1402 as relayed by a target AR-RS 1404. AK 610 is currently stored in mobile station 414, whereas target base station 1402 and target AR-RS 1404 have AK 1406 stored in their respective memories. As shown in FIG. 14, target base station 1402 is connected to the same gateway as AR-RS 408, from which mobile station 414 is being handed off, however, the initialization process 1400 will not change if target base station 1402 is connected to a different gateway than AR-RS 408.

Mobile station 414 sends a signaling message such as ranging request 1002, which includes authentication key identification, to target AR-RS 1404 to indicate that mobile station 414 is within range of target AR-RS 1404. Target AR-RS 1404 transmits a mobile station authentication request 1407, which includes authentication key identification, to target base station 1402. Target base station 1402 receives the mobile station authentication request 1407 but it cannot verify mobile station 414 because target base station 1402 does not recognize AK 610. Therefore, target base station 1402 may transmit an authentication failure response 1408 to target AR-RS 1404, which may transmit a ranging response 1409 to mobile station 414. Target base station 1402 may then require mobile station 414 to authenticate with AAA server 104 using IEEE 802.1X full authentication protocol 206. As a result of IEEE 802.1X full authentication protocol 206, gateway 106 distributes to mobile station 120 a PMK 1410. Gateway 106 also transmits an AK 1412 to target base station 1402 via AK Transfer 612. Mobile station 414 calculates AK 610 independently from PMK 1410.

In one exemplary embodiment, to allow target AR-RS 1404 to perform additional authentication steps to provide additional security to the network connection with mobile station 414, base station 400 transmits key response 614, which includes AK 1412, to target AR-RS 1404. When target AR-RS 1404 has AK 1412, it may perform one or both of SA-TEK 3-way handshake 214 and TEK 3-way handshake 216 with mobile station 414 to provide further security to the network connection with mobile station 414. During TEK 3-way handshake 216, AR-RS 1404 transmits to the mobile station 414 a traffic key such as TEK 1414, encrypted using KEK 1416. TEK 1414 may be randomly generated by the target AR-RS 1404.

FIG. 14 illustrates exemplary mobile station handoffs between a current AR-RS and a target AR-RS that are connected to different base stations. One of skill in the art will appreciate that the current AR-RS or the target AR-RS may be a mobile relay station such as AR-RS 408.

One of skill in the art will also appreciate that, in the scenario illustrated above in connection with FIG. 14, instead of sending AK 610 to AR-RS 406-409, base station 400 may send different security material to relay stations 406-409. For example, upon receiving AK 1412, base station 1402 may generate a verification key, e.g., MACK 618, using AK 610 and may send the verification key to AR-RS 1404 instead of sending AK 1412.

IV. MOBILE RELAY STATION HANDOFFS

Although the processes described above for initialization and handoffs apply to mobile relay stations as well, mobile relay stations and the mobile stations accessing the network from within mobile relay stations must also be prepared for a change in base station where the AR-RS (specifically, the mobile relay station) does not change.

Figure 15:
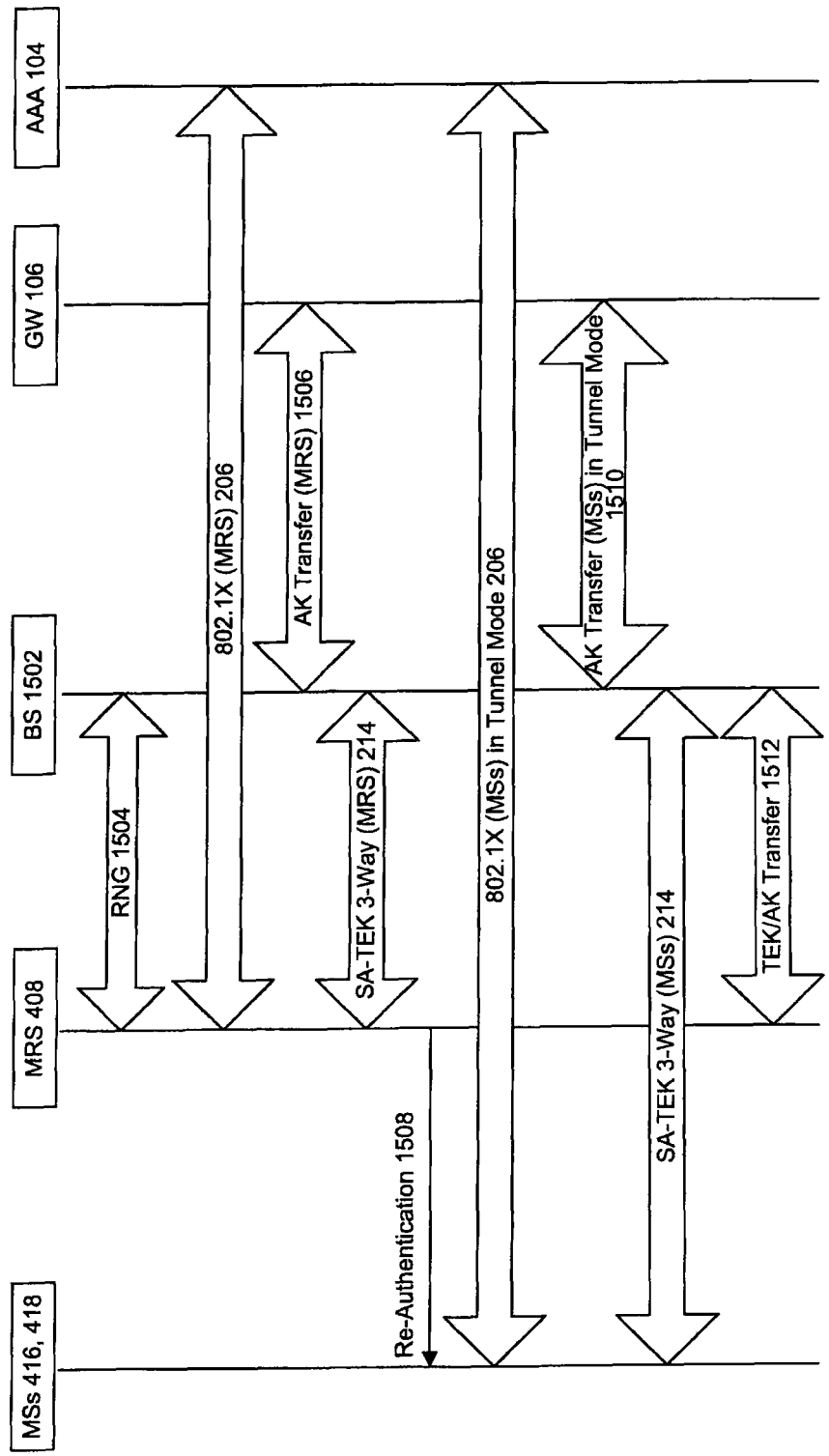
FIG. 15 is a signaling diagram of an exemplary mobile relay station handoff between a current base station and a target base station.

FIG. 15 is a signaling diagram of an exemplary mobile relay station handoff between a current base station and a target base station. In FIG. 15, mobile relay station AR-RS 408 may associate with a target base station 1502 when AR-RS 408 has moved or is about to move into the coverage area for target base station 1502. Mobile stations 416 and 418 are connected to AR-RS 408 and their connection with AR-RS 408 is preferably maintained throughout the transition to target base station 1502. In order to update the AKs of mobile stations 416 and 418, AR-RS 408 may issue a ranging message 1504 to target base station 1502 that indicates to base station 1502 that AR-RS 408 is within or approaching the coverage area for target base station 1502. Upon receipt of ranging message 1504, AR-RS 408 undergoes one or more of IEEE 802.1X authentication 206, SA-TEK 3-way handshake 214, and TEK 3-way handshake 216 with gateway 106 and AAA 104. As such, AR-RS 408 must receive an AK and be authenticated in a similar manner to authentication of a mobile station. Gateway 106 may transfer the AK for the mobile relay station at an AK Transfer 1506.

AR-RS 408 transmits a re-authentication trigger message 1508 to mobile stations 416 and 418. Upon receipt of the re-authentication trigger message 1508, the mobile stations 416 and 418 perform IEEE 802.1X full authentication 206 with gateway 106 and AAA server 104. Gateway 106 may calculate a new AK obtained from the existing PMK in the gateway for target base station 1502. Gateway 106 transfers all of the AKs for the mobile stations associated with AR-RS 408 at an AK Transfer 1510, and may do so in a tunnel mode, in which all of the parameters (e.g., AKs) of all mobile stations connecting to AR-RS 408 are transmitted at one time. In tunnel mode, the logical connection between two nodes, e.g., AR-RS 408 and gateway 106 is dedicated, and intermediate nodes (e.g., target base station 1502) do not process the tunnel packets but rather only forward them on. Mobile stations 416 and 418 then undergo SA-TEK 3-way handshake 214 with target base station 1502. Target base station 1502 will provide traffic keys and AKs for each of the mobile stations to AR-RS 408 at a TEK Transfer 1512, and may do so using tunnel mode. In one embodiment, the AKs are received at base station 1502 and mobile stations 416 and 418 prior to the inter-base station handoff to avoid a disconnect in service to mobile stations 416 and 418.

One of skill in the art will appreciate that although FIG. 15 shows target base station 1502 communicating with the network and AAA server 104 via gateway 106, target base station 1502 may also communicate with the network and AAA server 104 via gateway 108, or another gateway, with the same processing as described in FIG. 15.

Figure 16:
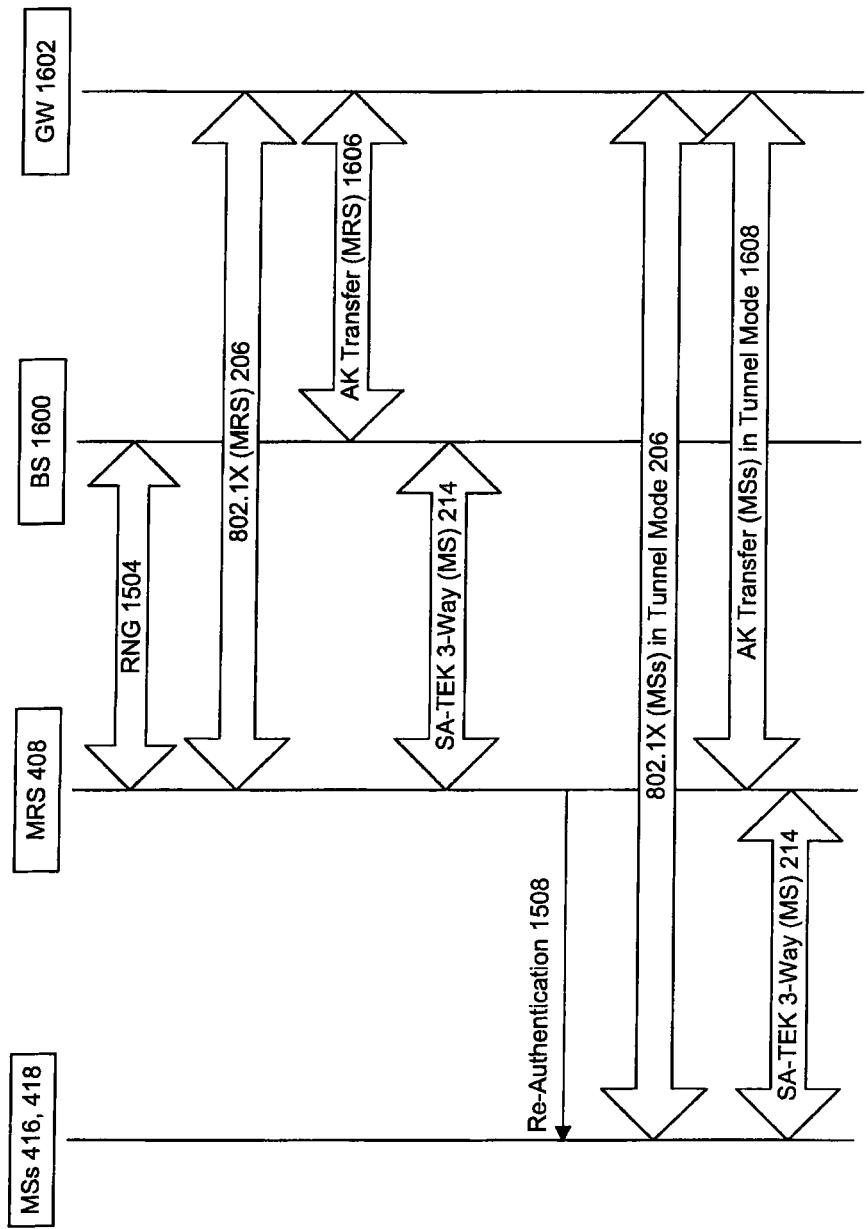
FIG. 16 is a signaling diagram of an exemplary mobile relay station handoff between a current base station and a target base station where the target base station communicates with a different gateway and where a mobile relay station can receive authentication keys and serve as an authenticator for mobile stations.

FIG. 16 is a signaling diagram of an exemplary mobile relay station handoff between a current base station and a target base station where a target base station 1600 communicates with a different gateway, i.e., a gateway 1602, and where AR-RS 408 can receive AKs and serve as an authenticator for mobile stations 416 and 418. In order to update the AKs of mobile stations 416 and 418, AR-RS 408 may issue a ranging message 1504 to target base station 1600 that indicates to base station 1600 that AR-RS 408 is within or approaching the coverage area for target base station 1600. After AR-RS 408 undergoes 802.1X authentication 206 with gateway 1602, gateway 1602 transfers the AK for the mobile relay station at AK Transfer 1606. AR-RS 408 may also undergo SA-TEK 3-way handshake 214 to obtain traffic keys for further data transmission of, for example, tunnel packets or to relay mobile station messages.

AR-RS 408 transmits a re-authentication trigger message 1508 to mobile stations 416 and 418. Upon receipt of the re-authentication trigger message 1508, the mobile stations 416 and 418 perform 802.1X authentication with gateway 1602 and AAA server 104. Gateway 1602 calculate a new AK for each of the mobile stations 416 and 418 and transfers all of the AKs for the mobile stations associated with AR-RS 408 at AK Transfer 1608 to AR-RS 408. In one embodiment, AR-RS 408 operates as an AR-RS and has the ability to authenticate mobile stations directly. Gateway 1602 may transmit the AKs corresponding to mobile stations 416 and 418 in tunnel mode. Mobile stations 416 and 418 then undergo SA-TEK 3-way handshake 214 with AR-RS 408. AR-RS 408 will provide traffic keys for each of the mobile stations to AR-RS 408 using SA-TEK 3-way transfer. Alternatively, AR-RS 408 may optionally avoid generating new traffic keys for mobile stations 416 and 418 if it receives the traffic keys from another AR-RS or from target base station 1602.

Figure 17:
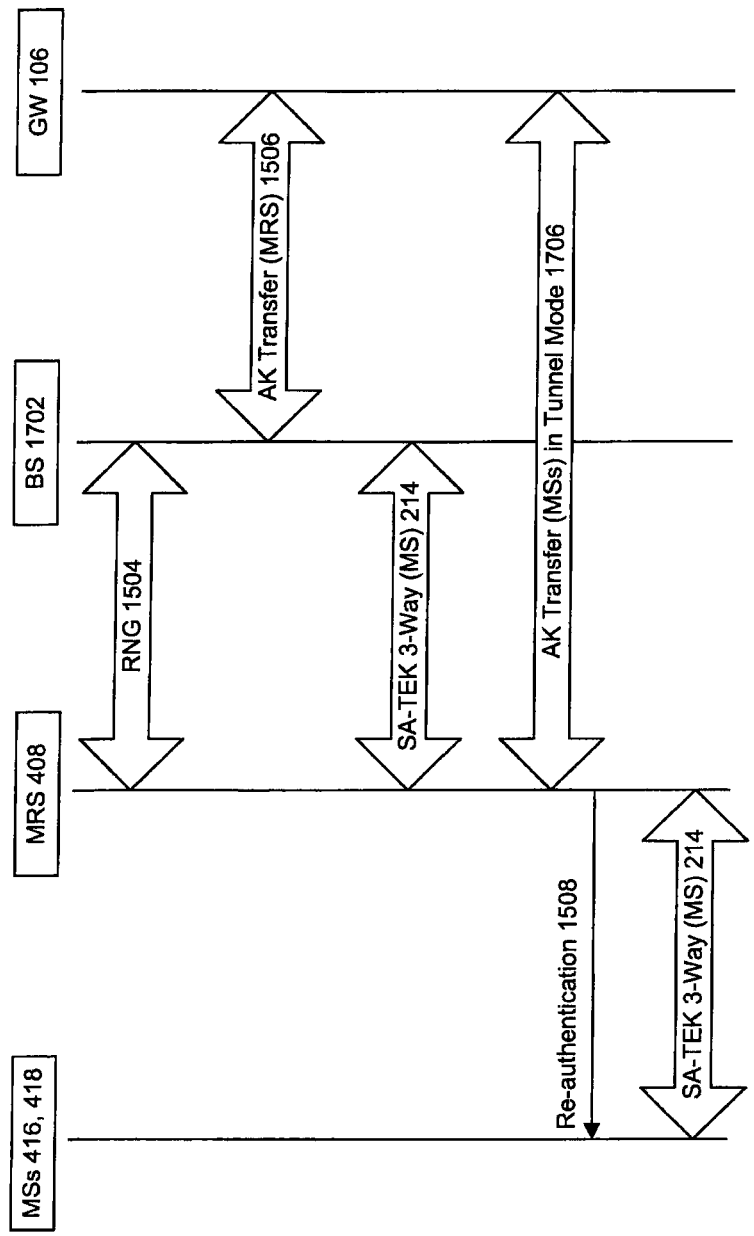
FIG. 17 is a signaling diagram of an exemplary mobile relay station handoff between a current base station and a target base station, in which the base stations are connected to the same gateway.

FIG. 17 is a signaling diagram of an exemplary mobile relay station handoff between a current base station and a target base station, in which the base stations are connected to the same gateway. In FIG. 17, AR-RS 408 has moved or is about to move from the coverage area for base station 1502 (FIG. 15) into the coverage area for target base station 1702. Target base station 1702 is served by the same gateway 106 as the current base station 1502. AR-RS 408 issues ranging message 1504 to target base station 1702 that indicates to base station 1702 that AR-RS 408 is within or approaching the coverage area for target base station 1702. AR-RS 408 must authenticate with gateway 106 and perform authentication protocols such as SA-TEK 3-way handshake 214. After AR-RS 408 is authenticated, gateway 106 transmits AKs for mobile stations 416 and 418 to AR-RS 408 at AK Transfer 1706. When multiple AKs are being sent from gateway 106 to AR-RS 408, gateway 106 may transmit the AKs by tunnel mode at AK Transfer 1706. AR-RS 408 transmits re-authentication trigger message 1508 to mobile stations 416 and 418. Upon receipt of the re-authentication trigger message 1508, mobile stations 416 and 418 perform SA-TEK 3-way handshake 214 with AR-RS 408 to update their respective AKs, and may do so with or without also updating their respective traffic keys. In one embodiment, the AKs are received at AR-RS 408 prior to the inter-base station handoff to avoid a disconnect of service to mobile stations 416 and 418.

Figure 18:
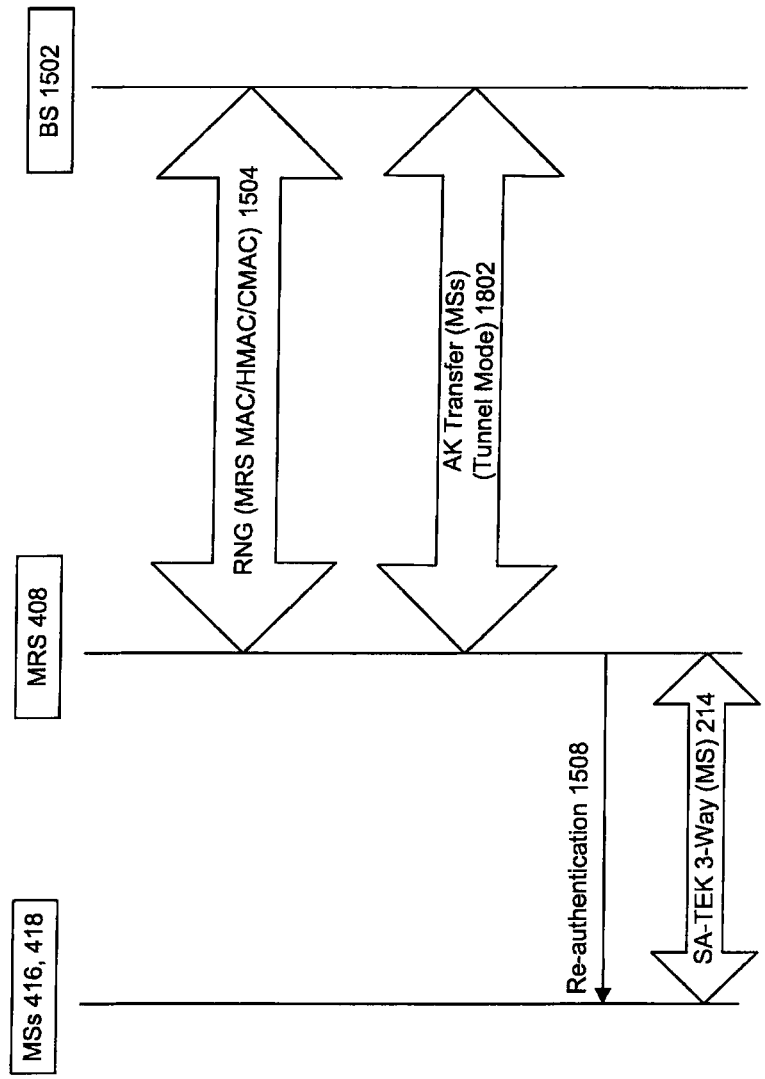
FIG. 18 is a signaling diagram of an exemplary mobile relay station handoff between a current base station and a target base station, in which the base stations are connected to the same gateway.

FIG. 18 is a signaling diagram of an exemplary mobile relay station handoff between a current base station and a target base station, in which the base stations are connected to the same gateway. In FIG. 18, AR-RS 408 has moved or is about to move from the coverage area for base station 1502 into the coverage area for target base station 1702. AR-RS 408 issues ranging message 1504 to target base station 1702 that indicates to base station 1702 that AR-RS 408 is within or approaching the coverage area for target base station 1702. Upon receipt of ranging message 1504, target base station 1702 transmits AKs for each of the mobile stations 416 and 418 to AR-RS 408. This is possible because base station 1702 has access to AKs for mobile station 416 and 418 due to their previous authentication with a base station 1502 within gateway 106. When multiple AKs are being sent from target base station 1502 to AR-RS 408, target base station 1502 may transmit the AKs by tunnel mode at an AK Transfer 1802. AR-RS 408 transmits a re-authentication trigger message 1508 to mobile stations 416 and 418. Upon receipt of the re-authentication trigger message 1508, the mobile stations 416 and 418 perform SA-TEK 3-way handshake 214 with AR-RS 408 to update their respective AKs, and may do so with or without also updating their respective traffic keys. In one embodiment, the AKs are received at AR-RS 408 prior to the inter-base station handoff to avoid a disconnect in service to mobile stations 416 and 418.

One of skill in the art will also appreciate that, in each of the scenarios illustrated above in connection with FIGS. 15-18, instead of sending AKs to target base station 1502, gateway 106 may send different security material, such as, for example, a verification key corresponding to AR-RS 408. Similarly, instead of sending AKs for mobile stations 416 and 418 to AR-RS 408, target base station 1502 may send different security material, such as, for example, verification keys corresponding to the mobile stations 416 and 418.

VI. CONCLUSION

Systems and methods disclosed herein may be implemented in digital electronic circuitry, or in computer hardware, firmware, software, or in combinations of them. Apparatus embodying the invention can be implemented in a computer program product tangibly embodied in a machine-readable storage device for execution by a programmable processor. Method steps consistent with the invention can be performed by a programmable processor executing a program of instructions to perform functions of the invention by operating on the basis of input data, and by generating output data. Embodiments consistent with the invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

It will be apparent to those skilled in the art that various modifications and variations can be made in the system and method for establishing security associations in wireless communications systems. For example, one of skill in the art will appreciate that ranging requests and responses are a type of signaling message and that other signaling messages may be used. In addition, one of skill in the art will appreciate that traffic encryption keys are a type of traffic key and that other traffic keys may be used, and that MACKs are a type of verification key and that other verification keys may be used. One of skill in the art will also appreciate that communication between base stations and relay stations can be wireless or wired. It is intended that the standard and examples be considered as exemplary only, with a true scope of the disclosed embodiments being indicated by the following claims and their equivalents.

What is claimed is:

1. A method of providing secure communications between a first base station, a first relay station, and a mobile station in a communication network, the method comprising:

receiving, by the first relay station, a signaling message from the mobile station, the signaling message including an identifier corresponding to the mobile station;

transmitting, by the first relay station, subsequent to receiving the signaling message, a security key request to the first base station;

receiving, by the first relay station, a security key from the first base station in response to the previously sent security key request, wherein the security key was generated from a prior authentication of the mobile station using signals transmitted through one of a second relay station, the first base station, or a second base station from which the mobile station was handed off to the first relay station; and authenticating, by the first relay station, the mobile station by verifying the identifier using the received security key generated from the prior authentication.

2. The method of claim 1, wherein the receiving of the signaling message includes receiving a ranging request.

3. The method of claim 1, further including receiving the security key as a master key.

4. The method of claim 3, further including receiving the master key as an authentication key (AK).

5. The method of claim 1, further comprising receiving the security key as a verification key.

6. The method of claim 5, wherein receiving the security key as a verification key includes receiving the security key as a message authentication code key (MACK).

7. The method of claim 1, further including receiving the signaling message including a message authentication code (MAC) corresponding to the mobile station; wherein the authenticating comprises verifying the MAC using the security key.

8. The method of claim 1, further comprises performing, by the first relay station, at least one of a security association signaling protocol and a traffic encryption key (TEK) 3-way handshake with the mobile station.

9. The method of claim 8, wherein performing, by the first relay station, at least one of a security association signaling protocol and a TEK 3-way handshake with the mobile station comprises performing at least one of a security association-traffic encryption key (SA-TEK) 3-way handshake and a TEK 3-way handshake with the mobile station.

10. The method of claim 1, further comprising:
generating, by the first relay station, a traffic key; and
transmitting, by the first relay station, encrypted data to the mobile station using the traffic key.

11. The method of claim 1, further comprising moving, by the first relay station, to a service area of a different base station.

12. The method of claim 1, wherein communication between the first base station and the first relay station is wireless.

13. A method of providing secure communications between a target base station, a first mobile relay station, and at least one mobile station in a communication network, the method comprising:

transmitting, by the first mobile relay station, a signaling message to the target base station, the signaling message including a message authentication code (MAC) corresponding to the at least one mobile station;

receiving, by the first mobile relay station, a responsive signaling message from the target base station;

receiving, by the first mobile relay station, at least one security key corresponding to the at least one mobile station from the target base station, wherein the at least one security key was generated from a prior authentication of the at least one mobile station using signals transmitted through one of a second mobile relay station, the target base station, or a second base station from which the at least mobile station was handed off to the first mobile relay station; and authenticating, by the first mobile relay station, the at least one mobile station by verifying the MAC using the at least one security key generated from the prior authentication of the at least one mobile station.

14. The method of claim 13, wherein the receiving at least one security key corresponding to the at least one mobile station includes receiving the at least one security key in a secure tunnel mode.

15. The method of claim 13, wherein the authenticating comprises performing IEEE 802.1X authentication.

16. The method of claim 13, further comprising performing at least one of a security association signaling protocol and a traffic encryption key (TEK) 3-way handshake between the first mobile relay station and the target base station.

17. The method of claim 16, wherein performing, by the first mobile relay station, at least one of a security association signaling protocol and a TEK 3-way handshake with the mobile station comprises performing at least one of a security association-traffic encryption key (SA-TEK) 3-way handshake and a TEK 3-way handshake with the mobile station.

18. The method of claim 13, wherein the receiving at least one security key comprises receiving the at least one security key in tunnel mode.

19. The method of claim 13, wherein the receiving at least one security key comprises receiving an authentication key (AK).

20. The method of claim 13, further including receiving the security key as a verification key.

21. The method of claim 20, wherein receiving the security key as a verification key includes receiving the security key as a message authentication code key (MACK).

22. The method of claim 13, wherein communication between the target base station and the first mobile relay station is wireless.

23. A first relay station for providing secure communications in a communication network, the first relay station comprising:
at least one memory to store data and instructions; and
at least one processor configured to access the memory and configured to, when executing the instructions:
subsequent to receiving a signaling message from a mobile station, transmit a security key request to a first base station, the security key request including an identifier corresponding to the mobile station; and
authenticate the mobile station by verifying the identifier using a security key received from the first base station in response to the previously transmitted security key request, wherein the security key was generated from a prior authentication of the mobile station using signals transmitted through one of a second relay station, the first base station, or a second base station from which the mobile station was handed off to the first relay station.

24. The first relay station of claim 23, wherein the signaling message is a ranging request.

25. The first relay station of claim 23, wherein the security key is a master key.

26. The first relay station of claim 23, wherein the master key is an authentication key (AK).

27. The first relay station of claim 23, wherein the security key is a verification key.

28. The first relay station of claim 23, wherein the verification key is a message authentication code key (MACK).

29. The first relay station of claim 23, wherein the signaling message includes a message authentication code (MAC) corresponding to the mobile station and the authenticating comprises verifying the MAC using the security key.

30. The first relay station of claim 23, wherein the processor is further configured to, when performing the instructions:
perform at least one of a security association signaling protocol and a traffic encryption key (TEK) 3-way handshake with the mobile station.

31. The first relay station of claim 30, wherein performing, by the first relay station, at least one of a security association signaling protocol and a TEK 3-way handshake with the mobile station comprises performing at least one of a security association-traffic encryption key (SA-TEK) 3-way handshake and a TEK 3-way handshake with the mobile station.

32. The first relay station of claim 23, wherein the processor is further configured to, when performing the instructions:
generate a traffic key; and
cause transmission of encrypted data to the mobile station using the traffic key.

33. The first relay station of claim 23, wherein the first relay station is a mobile relay station.

34. The first relay station of claim 23, wherein communication between the first base station and the first relay station is wireless.

35. A first base station for providing secure communications in a communication network, the first base station comprising:
at least one memory to store data and instructions; and
at least one processor configured to access the memory and configured to, when executing the instructions:
cause transmission of a security key to a first relay station in response to a security key request received from the first relay station,
wherein the security key was generated from a prior authentication of the mobile station using signals transmitted through one of a second relay station, the first base station, or a second base station from which the mobile station was handed off to the first relay station; and
wherein the security key request includes an identifier corresponding to the mobile station, and the first relay station authenticates the mobile station by verifying the identifier using the security key generated from the prior authentication.

36. The first base station of claim 35, wherein communication between the first base station and the first relay station is wireless.

37. A system for providing secure communications, the system comprising:
a first base station configured to provide access to a communication network, authenticate a mobile station over the network, receive at least one security key, receive at least one security key request, and transmit the at least one security key in response to the security key request; and
a first relay station in communication with the first base station for transmitting the at least one security key request to the first base station, for receiving the at least one security key from the first base station in response to the security key request, and for providing secure data transmissions to a mobile station using the security key,
wherein the at least one security key includes at least one of an authentication key (AK) and a verification key, and was generated from a prior authentication of the mobile station using signals transmitted through one of a second relay station, the first base station, or a second base station from which the mobile station was handed off to the first relay station; and
wherein the at least one security key request includes an identifier corresponding to the mobile station, and the first relay station authenticates the mobile station by verifying the identifier using the at least one security key generated from the prior authentication.

38. The system of claim 37, wherein the verification key is a message authentication code key (MACK).

39. The system of claim 37, wherein communication between the first base station and the first relay station is wireless.

40. A method of providing secure communications between a first base station, a first relay station, and a mobile station in a communication network, the method comprising:
performing key distribution upon receipt of a key request from the first relay station to distribute a verification key corresponding to the mobile station to the first relay station, wherein the key request includes an identifier corresponding to the mobile station, and the verification key was generated from a prior authentication of the mobile station using signals transmitted through one of a second relay station, the first base station, or a second base station from which the mobile station was handed off to the first relay station; and
performing key verification, by the first relay station, to authenticate the mobile station by verifying the identifier using the verification key generated from the prior authentication.

41. The method of claim 40, wherein performing key distribution to distribute a verification key includes distributing a message authentication code key (MACK).

42. The method of claim 40, further comprising:
performing key verification, by the mobile station, to identify the first relay station.

43. The method of claim 40, wherein communication between the first base station and the first relay station is wireless.

44. A method of providing secure communications between a first base station, a first relay station, and a mobile station in a communication network, the method comprising:
performing key distribution upon receipt of a key request from the first relay station to distribute a verification key corresponding to the mobile station to the first relay station, wherein the key request includes an identifier corresponding to the mobile station, and the verification key was generated from a prior authentication of the mobile station using signals transmitted through one of a second relay station, the first base station, or a second base station from which the mobile station was handed off to the first relay station;
performing key verification, by the first relay station, to authenticate the mobile station by verifying the identifier using the verification key generated from the prior authentication; and
performing key verification, by the mobile station, to authenticate the first relay station.

45. The method of claim 44, wherein communication between the first base station and the first relay station is wireless.

* * * * *